US008235352B2

(12) United States Patent
Irwin et al.

(10) Patent No.: US 8,235,352 B2
(45) Date of Patent: Aug. 7, 2012

(54) DIAPHRAGM VALVE FOR IRRIGATION SYSTEMS

(75) Inventors: Kevin M. Irwin, Tucson, AZ (US); Clint R. Haas, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 1386 days.

(21) Appl. No.: 11/751,316

(22) Filed: May 21, 2007

(65) Prior Publication Data

US 2008/0289693 A1 Nov. 27, 2008

(51) Int. Cl.
*F16K 31/00* (2006.01)
(52) U.S. Cl. ....... 251/14; 251/285; 251/331; 251/30.01; 251/30.02; 251/30.03
(58) Field of Classification Search .................... 251/14, 251/358, 366, 58, 118, 331, 122, 335.2, 285, 251/284, 30.01–30.03; 137/12, 625.3, 181
See application file for complete search history.

(56) References Cited

U.S. PATENT DOCUMENTS

| | | | |
|---|---|---|---|
| 2,537,308 A * | 1/1951 | Hansen | 251/331 |
| 2,702,686 A * | 2/1955 | Fortune | 251/335.2 |
| 3,208,721 A * | 9/1965 | McHugh | 251/331 |
| 3,664,369 A | 5/1972 | Johnson | |
| 3,892,255 A | 7/1975 | Johnson | |
| 4,081,171 A | 3/1978 | Morgan et al. | |
| 4,185,663 A * | 1/1980 | Stripling | 251/324 |
| 4,251,053 A | 2/1981 | Wurzer | |
| 4,838,527 A | 6/1989 | Holley | |
| 5,104,090 A | 4/1992 | Grizzle et al. | |
| 5,213,303 A | 5/1993 | Walker | |
| 5,271,601 A | 12/1993 | Bonzer et al. | |
| 5,529,280 A | 6/1996 | Satoh et al. | |
| 5,722,454 A | 3/1998 | Smith et al. | |
| 5,836,571 A | 11/1998 | Streitman et al. | |
| 6,003,835 A | 12/1999 | Moller | |
| 6,079,437 A | 6/2000 | Beutler et al. | |
| 6,102,071 A * | 8/2000 | Walton et al. | 251/331 |
| 6,216,731 B1 | 4/2001 | Frenkel | |
| 6,415,810 B2 | 7/2002 | Matsuura et al. | |
| 6,508,266 B2 | 1/2003 | Iritani et al. | |
| 2006/0016494 A1* | 1/2006 | Irwin et al. | 137/625.28 |

\* cited by examiner

*Primary Examiner* — John Fristoe, Jr.
*Assistant Examiner* — Andrew J Rost
(74) *Attorney, Agent, or Firm* — Fitch, Even, Tabin & Flannery, LLP

(57) ABSTRACT

A diaphragm valve for use in an irrigation system is disclosed that is adapted to reduce the water hammer effect, reduce debris in a flow path through a valve seat, improve bleed operation and/or reduce manufacturing and materials costs.

13 Claims, 16 Drawing Sheets

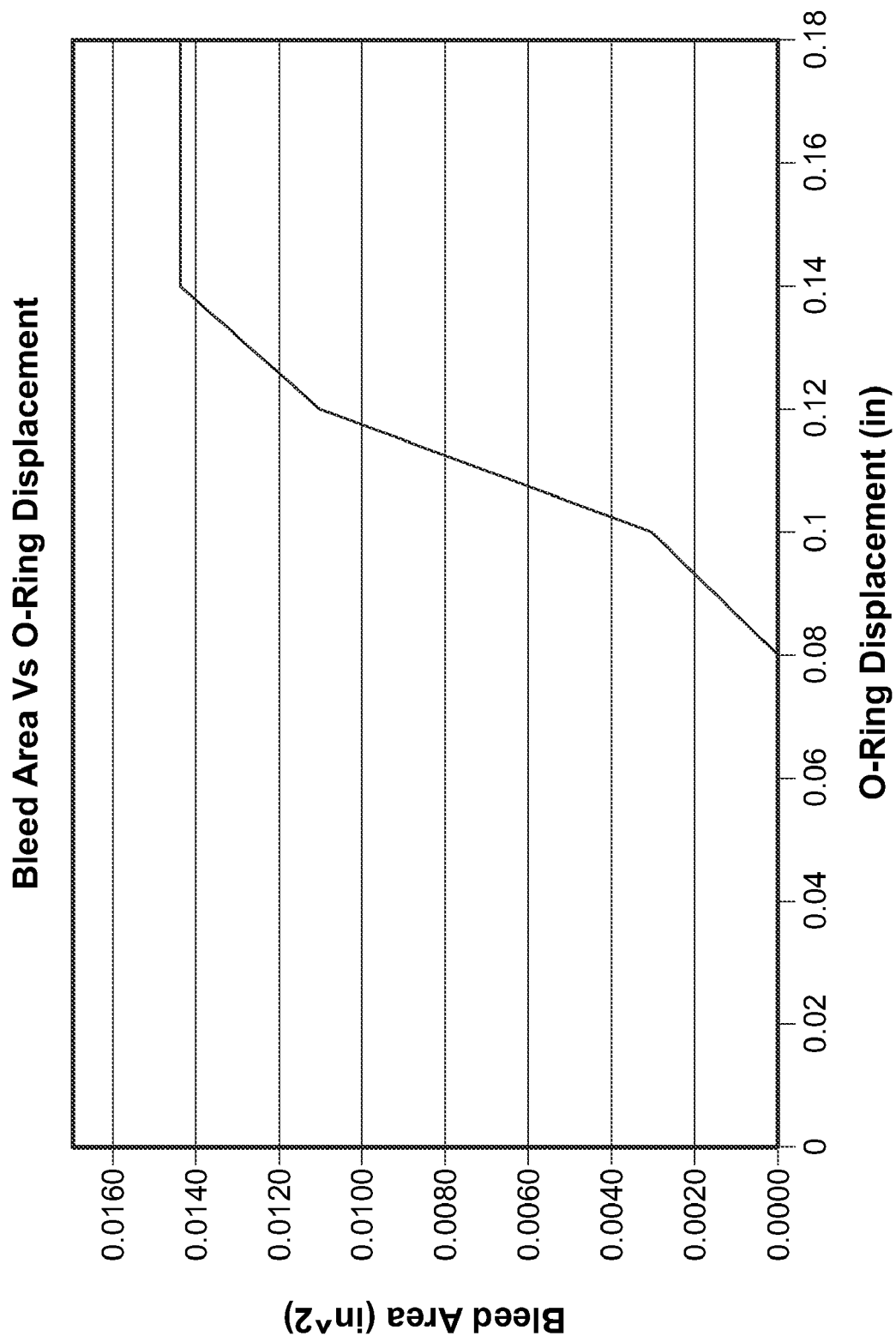

DIAPHRAGM VALVE FOR IRRIGATION SYSTEMS

FIELD

The disclosure is directed to a diaphragm valve for irrigation systems, and in particular to a diaphragm valve configured for improved flow, improved venting and/or reduced costs of manufacture.

BACKGROUND

Diaphragm valves for use in irrigation systems typically have an inlet opening, an exit opening and a diaphragm element having a seal positioned to selectively open and close against a generally cylindrical diaphragm seat to permit or block fluid flow through an opening of the diaphragm seat and thus from the inlet opening to the outlet opening. A control chamber is positioned on the opposite side of the diaphragm element from the seat to control the position of the seal of the diaphragm element. When the fluid pressure acting on the diaphragm element from the control chamber side exceeds the fluid pressure acting on the opposite side of the diaphragm element, the diaphragm element will be forced against the diaphragm seat to block fluid flow through the opening of the seat and thereby block fluid flow from the inlet opening to the outlet opening. Conversely, when the fluid pressure acting on the diaphragm element from the control chamber side is less than the fluid pressure acting on the opposite side of the diaphragm element, the diaphragm element will be forced away from the diaphragm seat to permit fluid flow through the opening of the seat and thereby permit fluid flow from the inlet opening to the outlet opening.

The seal of the diaphragm element often engages an annular face of the diaphragm seat when the diaphragm element is in its closed position to block fluid flow through the opening of the seat and to the outlet opening. As the diaphragm element moves from its open position to its closed position, the flow area between the diaphragm seat and the seal continually decreases in correspondence with the spacing of the seal from the diaphragm seat until the seal is engaged with the diaphragm seat to block flow through the opening of the diaphragm seat and to the outlet opening. When the seal engages the diaphragm seat to block flow through the opening of the diaphragm seat, the abrupt change in the flow area between the seal and the diaphragm seat from greater than zero, immediately prior to engagement, and zero, at the time of engagement, can cause a sudden pressure spike greater than the upstream pressure. More specifically, the pressure spike in the upstream pressure can be caused as the motion energy in the flowing fluid is abruptly converted to pressure energy acting on the components of the diaphragm valve. This pressure spike can cause the diaphragm valve to experience a water hammer effect, which can undesirably result in increased stress on the components of the diaphragm valve, as well as other components of the irrigation system, and can lead to premature failure of the components.

An attempt to address the water hammer effect is disclosed in U.S. Pat. No. 5,104,090 ("the '090 patent"). The '090 patent discloses V-shaped radial grooves provided on an outer surface of a diaphragm. However, the diaphragm of the '090 patent is configured such that the grooves are generally downstream of the valve seat, which can undesirably permit debris, such as grit and the like, to pass the valve seat before reaching the grooves. Accumulation of debris on the valve seat can have a negative impact on the seal between the diaphragm and the valve seat, such as by abrading the portion of the diaphragm that repeatedly contacts the valve seat.

In order to control the pressure in the control chamber, a fluid entrance path and a fluid exit path to and from the control chamber are typically provided. The fluid entrance path may extend between the inlet opening and the control chamber, and may be continuously supplied with fluid from the inlet opening. The fluid exit path may extend between the control chamber and the outlet opening. A selectively actuable control valve may be positioned to block fluid flow through the fluid exit path.

When the control valve is positioned to block fluid flow through the fluid exit path from the control chamber, the fluid entrance path continues to permit fluid to flow from the inlet opening to the control chamber, thereby causing fluid to accumulate in the control chamber. The building pressure in the control chamber pushing down acts on the whole upper surface of the diaphragm assembly. The underside of the diaphragm assembly only sees the high pressure outside the radius of the seat cylinder. The fluid flowing through the restriction between the diaphragm assembly and the valve seat undergoes a drop in pressure as it passes through the restrictive aperture. The underside of the diaphragm, inside of the seat radius, sees only this reduced pressure. Therefore, as the downward force due to the building pressure acting on the entire upper surface of the diaphragm assembly exceeds the upward force of the inlet pressure acting only on the underside area outside the seat radius, the diaphragm assembly begins to descend and eventually closes the valve.

When the control valve is positioned to permit fluid flow through the fluid exit path from the control chamber, fluid exits the control chamber at a faster rate than fluid enters the control chamber. This causes the fluid pressure acting on the control chamber side of the diaphragm element to decrease relative to the fluid pressure acting on the side of the diaphragm element facing the inlet opening. The fluid pressure in the inlet opening then causes the diaphragm element to move to its open position, whereby the seal of the diaphragm element is spaced from the diaphragm seat and fluid flow is permitted from the inlet opening, through the opening of the diaphragm seat and through the exit opening.

During installation and operation of the diaphragm valve, air can become trapped in the control chamber. The presence of excess air, a compressible fluid, in the control chamber can adversely effect the operation of the diaphragm valve, and in particular the shifting of the diaphragm element between its open and closed positions. For example, excess air in the control chamber can allow the diaphragm element to shift from its open position to its closed position more rapidly than intended, which can further exacerbate the water hammer effect discussed above. In order to permit for air to be removed from the control chamber, diaphragm valves are often provided with manually-operated bleed mechanisms that allow for a user to selectively vent air from the control chamber.

One example of a manually-operated bleed mechanism is disclosed in U.S. Pat. No. 6,079,437 ("the '437 patent"). The '437 patent discloses a flow control stem that is pushed downwardly relative to a bonnet to position an o-ring seated in a groove in the flow control stem away from a shoulder of the bonnet to permit fluid to vent therepast through a vent gap. However, in such an arrangement the o-ring could undesirably become unseated from the groove of the flow control stem due to the pressure of the venting fluid. If the o-ring is unseated, the resealing of the vent gap can inadvertently occur during venting, resulting in a diaphragm valve that does not properly vent and thus not properly operate.

Another drawback of typical diaphragm valves is that their diaphragms are often internally reinforced with fibers or made from a more expensive, specialized material, which can add to the cost of the diaphragms. However, if the internal reinforcements were simply removed, the diaphragm could stretch in an uncontrolled manner in response to fluid pressure, particularly in the case of reverse-flow diaphragm valves.

In view of the foregoing deficiencies in existing diaphragm valves, there remains an unmet need for diaphragm valves having improved flow, including diaphragm valves configured to reduce the water hammer effect and/or improve bleed operation and configured for reduced manufacturing and materials costs.

SUMMARY

A diaphragm valve is disclosed that addresses the deficiencies with existing diaphragm valves, and is adapted to reduce the water hammer effect, improve bleed operation and reduce manufacturing and materials costs.

The diaphragm valve has an inlet passage and an outlet passage connected by an opening in a diaphragm valve seat. The opening in the diaphragm valve seat can be selectively blocked by a diaphragm sealing member to prevent fluid flow from the inlet passage to the outlet passage when the diaphragm valve is in the closed position. When the diaphragm valve is in the open position, the diaphragm sealing member of a diaphragm element is spaced from the diaphragm valve seat to permit fluid flow through the opening thereof.

A control chamber is provided on an opposite side of the diaphragm element from the diaphragm valve seat to control the position of the diaphragm sealing member relative to the diaphragm valve seat. The control chamber is supplied with fluid from the inlet passage through a control chamber fluid path. A solenoid valve selectively blocks an exit passage between the control chamber and the outlet opening of the diaphragm valve. When the solenoid valve is closed to block fluid from exiting the control chamber, the net force acting on the upper surface of the diaphragm element is greater than that acting on the opposite side thereof, which causes the first and second seals to engage the diaphragm valve seat to block fluid flow through the opening thereof and thereby prevent fluid flow between the inlet opening and the outlet opening. Conversely, when the solenoid valve is open, fluid is permitted to drain from the control chamber into the outlet passage, thereby reducing the pressure in the control chamber acting on the diaphragm element compared to the pressure acting on the opposite side of the diaphragm element. This pressure imbalance causes the diaphragm sealing member of the diaphragm element to move away from the diaphragm valve seat in order to permit fluid flow through the opening of the diaphragm valve seat and thus between the inlet and outlet passages of the diaphragm valve.

The diaphragm valve has multi-position sealing in order to slow the time required to shift the diaphragm valve from its open position to its closed position, and thereby reduce any pressure spike and water hammer effect. More specifically, an intermediate position of the diaphragm element between the open and closed positions is provided where the fluid flow through the opening is only partially blocked. The multi-stage sealing is accomplished by configuring the diaphragm sealing member to have an outer annular segment spaced by a groove from an inner sealing segment. The annular segment engages an outwardly-facing surface of the valve seat and the inner sealing segment engages an upwardly facing surface of the valve seat to fully block fluid flow through the opening thereof in the closed stage.

In the open position, both the annular segment and the inner sealing segment of the diaphragm sealing member of the diaphragm element are spaced from the valve seat to permit fluid flow through the opening of the valve seat and thus between the inlet and outlet of the diaphragm valve. During the intermediate stage, the annular segment of the diaphragm sealing member engages portions of the outer surface of the valve seat and the sealing segment is spaced from the upwardly facing surface of the valve seat. However, the engaged portions are spaced apart by recesses and fluid flow is permitted through the recesses of the valve seat and into the annular segment. In the closed position, both the annular segment and the sealing segment of the diaphragm sealing member are engaged with the valve seat to generally prevent fluid flow through the opening of the valve seat and thus between the inlet and outlet of the diaphragm valve.

A reduction of debris in the flow path between the inlet passage and the outlet passage can be achieved by configuring the diaphragm sealing member to have the aforementioned annular and sealing segments. Positioning the annular segment radially outward, and thus upstream of, the sealing segment can cause the annular segment to reduce the flow area between the valve seat and the diaphragm sealing member prior to the diaphragm valve being in its closed position to effectively screen some debris from passing to the portion of the valve seat that is engaged by the inner sealing segment of the diaphragm sealing member of the diaphragm element.

The improve bleed or venting properties of the diaphragm valve are achieved by having a flow control stem that can be externally depressed to move a seal, such as an o-ring seated in a groove thereon, away from a sealing seat of the bonnet where the sealing seat is configured to have a gradual increase in flow area as the seal is moved away from the sealing seat. The sealing seat may be provided with radial grooves or recesses to provide for bypass passages to permit the flow area between the seal and the sealing seat to increase gradually during venting, thereby reducing any potential sudden pressure impact on the seal which could dislodge the seal and urge the seal back against the sealing seat of the bonnet.

Reduction in manufacturing and material costs of the diaphragm member may be achieved by using materials lacking fiber reinforcement. Instead, the flexible diaphragm material, such as a nitrile rubber, may be co-molded around portions of a generally rigid stiffener. This can result in a less expensive diaphragm member by reducing the material costs of the flexible diaphragm material as compared to reinforced materials. To prevent the flexible diaphragm material, and specifically the outward portions spaced from the stiffener, from unduly stretching, a flow control piston is provided with an outwardly-extending diaphragm web support that is positioned to abut a substantial portion of the outward portions of the flexible diaphragm material when the material is subjected to fluid pressure.

BRIEF DESCRIPTION OF THE DRAWINGS

FIG. 18 is a graph illustrating the flow area through a vent of the bonnet depending upon the position of the diaphragm valve stem assembly.

DETAILED DESCRIPTION OF THE DRAWINGS

A diaphragm valve 100 and its operation is disclosed herein and illustrated in FIGS. 1-18 that is adapted to reduce the water hammer effect, reduce debris in a flow path through a valve seat, improve bleed operation and reduce manufacturing and materials costs. The reduction in the water hammer effect is achieved using multi-stage sealing. The reduction in debris in the flow path is achieved using radially outward and radially inward sealing segments of a diaphragm element to reduce the flow area adjacent a seat of the diaphragm. The improved bleed operation is achieved using a sealing seat that results in a gradual increase of flow area for bleeding, as opposed to a rapid increase as in the prior art. Finally, the reduced manufacturing and materials costs are achieve in various ways discussed in greater detail herein, including use of an unreinforced material for the diaphragm element.

Figure 1:
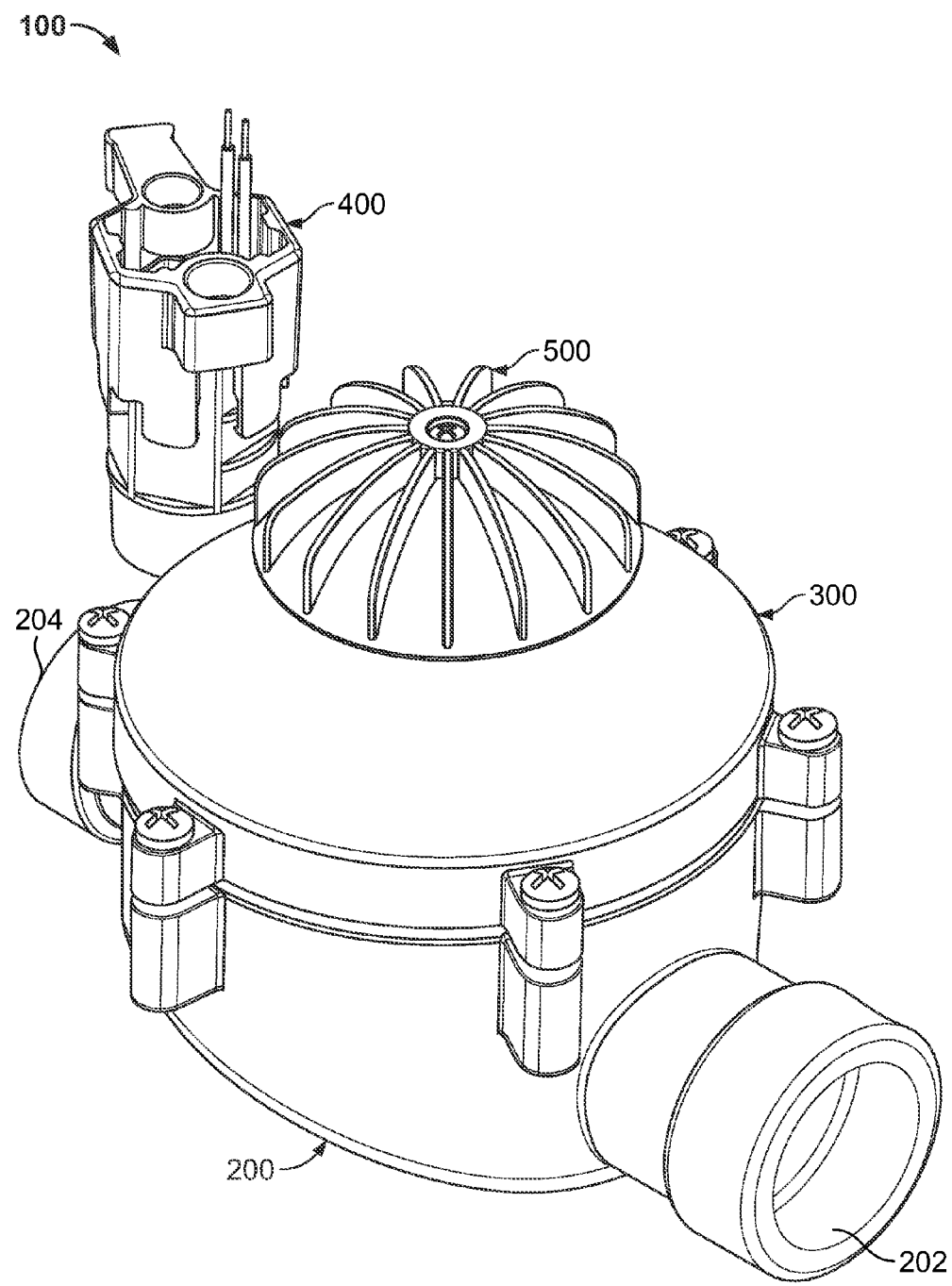
FIG. 1 is a perspective view of a diaphragm valve for irrigation systems having an open stage, an intermediate stage and a closed stage and showing a valve body, a bonnet, a flow-control handle and a solenoid valve.
Figure 2:
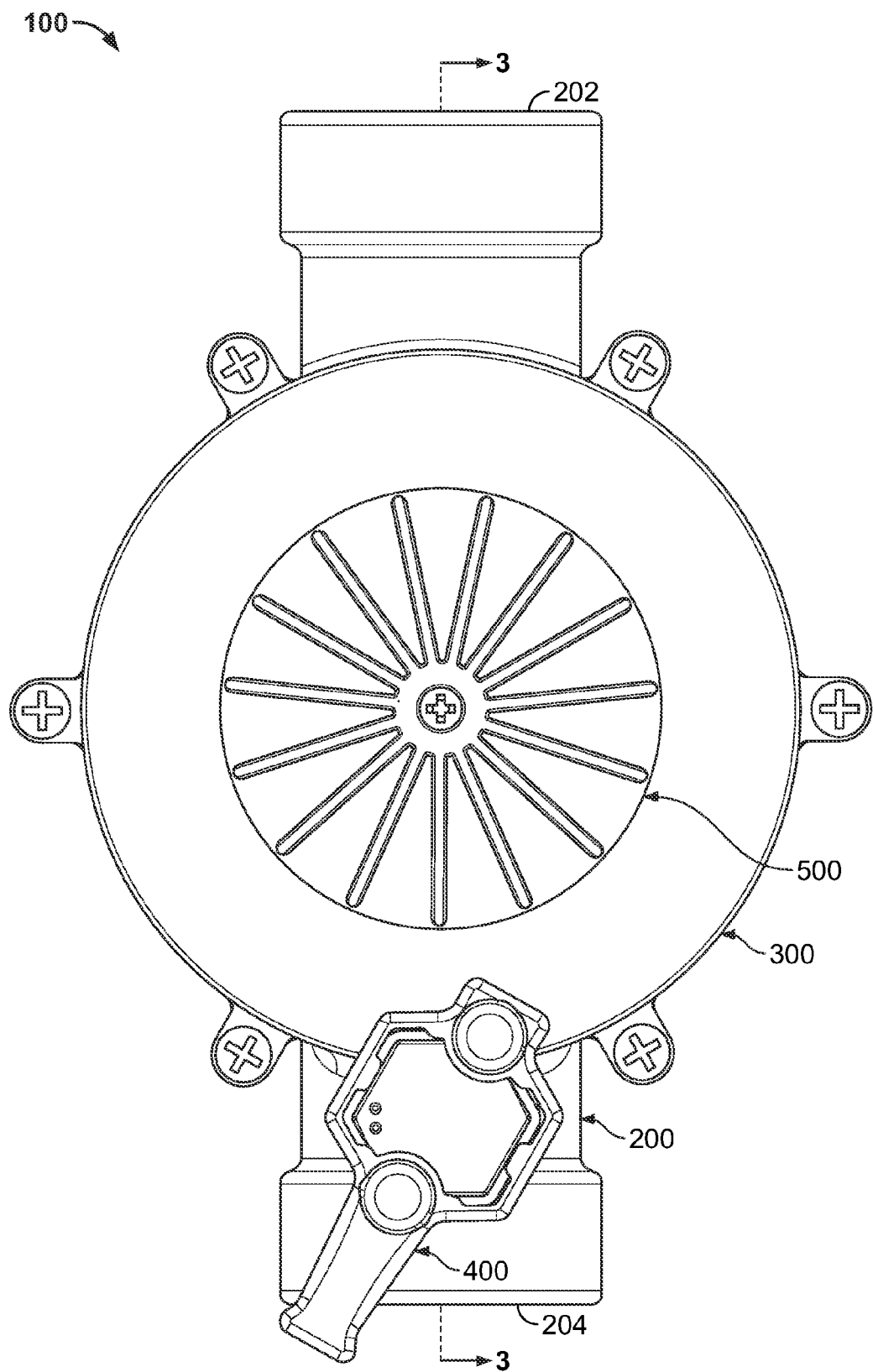
FIG. 2 is a top plan view of the diaphragm valve of FIG. 1.
Figure 3:
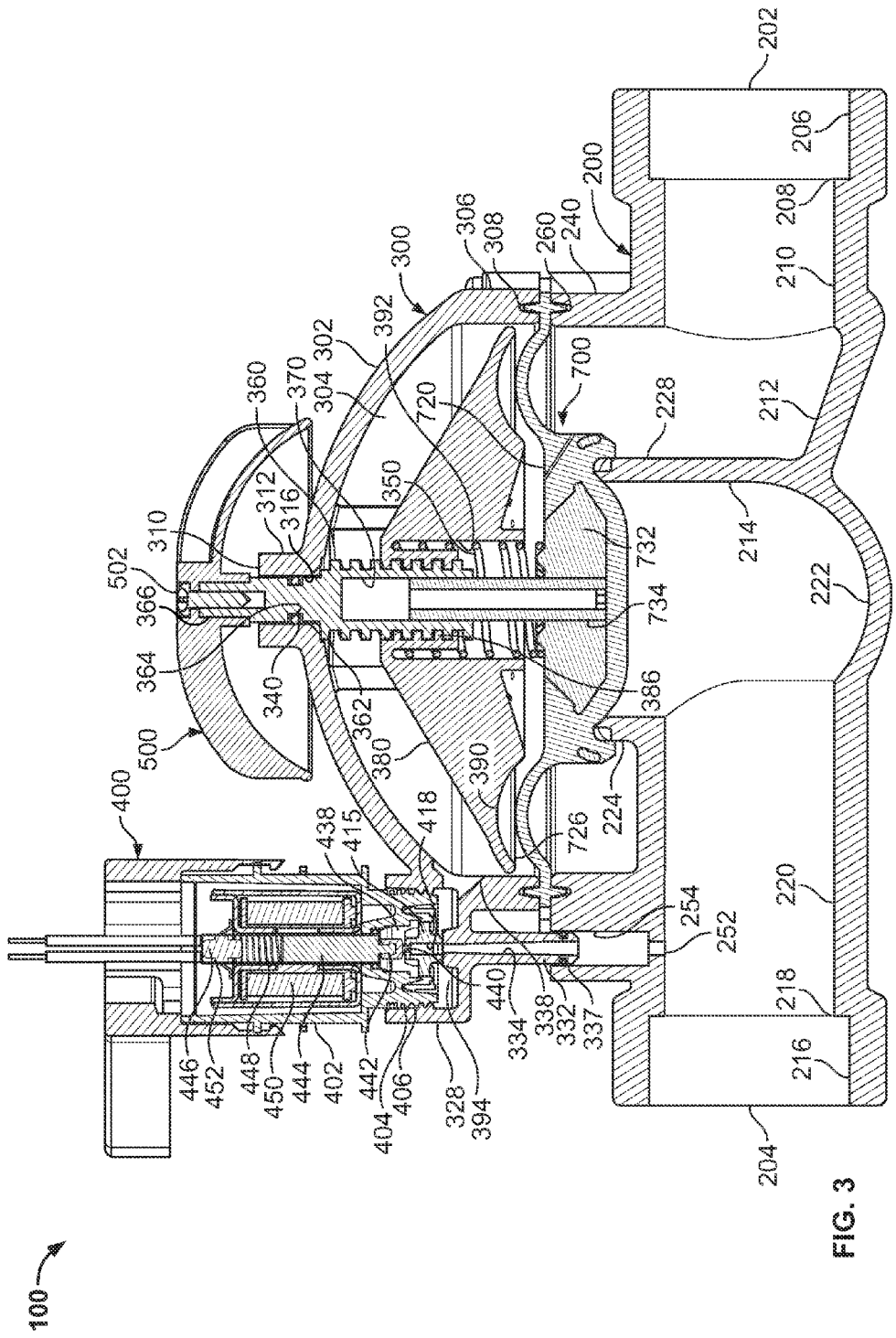
FIG. 3 is a section view of the diaphragm valve of FIG. 1 taken along line 3-3 of FIG. 2 and showing the diaphragm valve in the closed stage and a vent passage closed to prevent venting from a control chamber.
Figure 4:
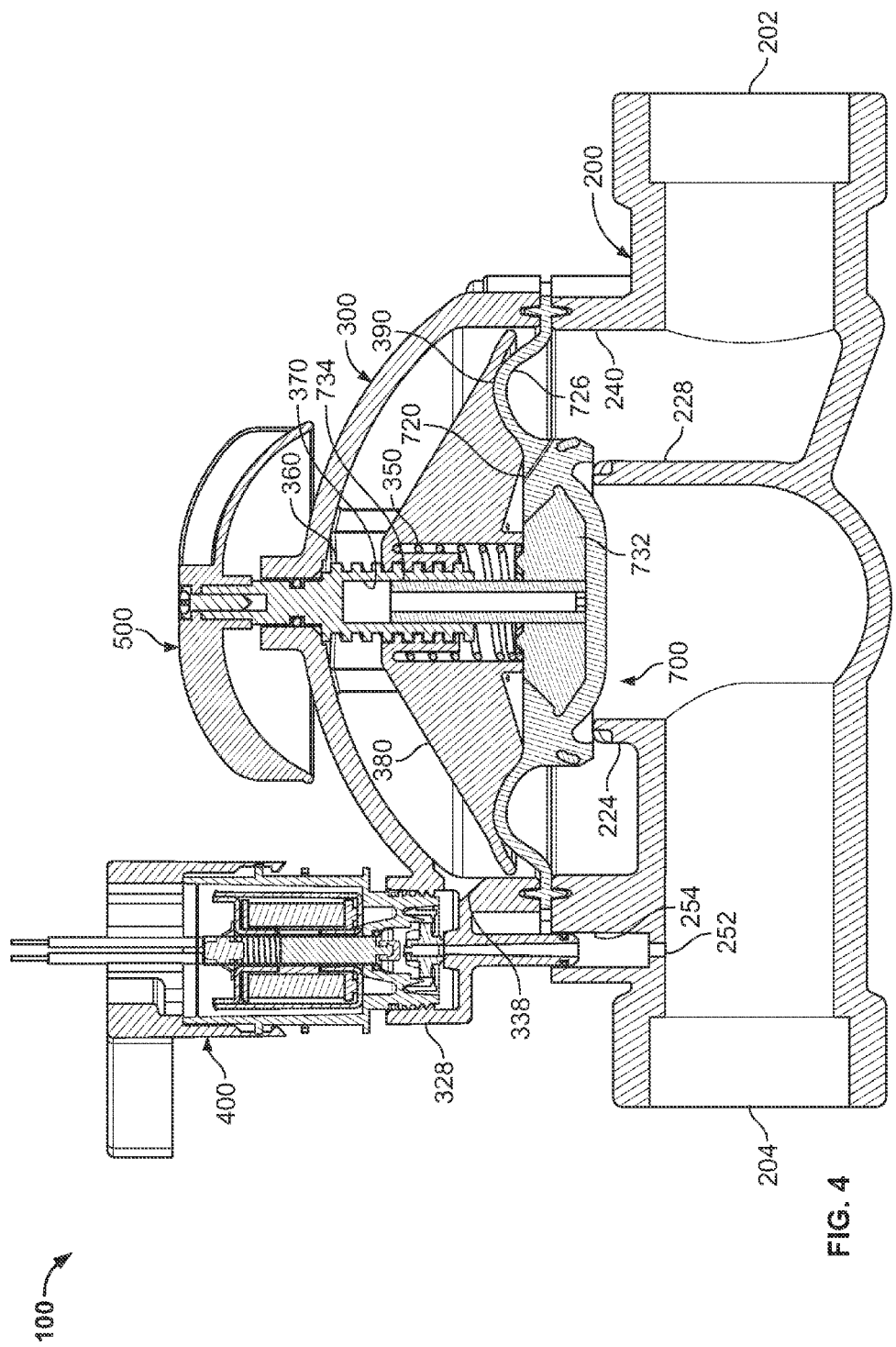
FIG. 4 is a section view of the diaphragm valve of FIG. 1 similar to that of FIG. 3 but showing the diaphragm valve in the open stage.

The diaphragm valve 100 consists of a valve body 200, a bonnet 300 attached to the valve body 200 and a solenoid valve 400 attached to both the bonnet 300 and valve body 200, as illustrated in FIGS. 1 and 2. The diaphragm valve 100 includes an inlet 202 and an outlet 204. A diaphragm valve seat 224 is disposed between the inlet 202 and the outlet 204. The diaphragm valve 100 includes an internal, centrally located diaphragm assembly 700 that is shiftable both away from and toward the diaphragm valve seat 224, as illustrated in FIGS. 3 and 4. When the diaphragm assembly 700 is engaged with the diaphragm valve seat 224, fluid flow from the inlet 202 to the outlet 204 of the diaphragm valve 100 is blocked. Conversely, when the diaphragm assembly 700 is spaced from the diaphragm valve seat 224, fluid flow from the inlet 202 to the outlet 204 of the diaphragm valve 100 is permitted. The solenoid valve 400 controls the fluid pressure in an internal control chamber 304, positioned between the valve body 200 and the bonnet 300, and is used to shift the diaphragm assembly 700 relative to the diaphragm valve seat 224.

A generally dome-shaped flow-control handle 500 is positioned over the bonnet 300, on a side of the bonnet 300 opposite from the valve body 200. The flow-control handle 500 permits external adjustments to be made to the spacing, and thus the flow area, between the diaphragm assembly 700 and the diaphragm valve seat 224 when the diaphragm valve 100 is in its open position, as will be discussed in greater detail below. A handle retention screw 502 is positioned in a central aperture of the flow-control handle 500, and is part of a flow-control and bleed assembly 600 (illustrated in FIG. 9) of the diaphragm valve 100. The handle retention screw 502 and flow-control and bleed assembly 600 permit external bleeding fluid from the control chamber 304, as also will be discussed in greater detail below. The flow-control and bleed assembly 600 can also be used to flush debris from the flow paths.

Turning now to more of the details of the components, the valve body 200 defines the inlet opening 202 and outlet opening 204, as well as the annular diaphragm valve seat 224 and a divider wall 214 between the inlet fluid passage and the outlet fluid passage. With specific reference to FIG. 3, the inlet fluid passage includes a larger diameter segment 206 immediately adjacent the inlet opening 202 that is sized to be joined to piping of an irrigation system. A reduced diameter segment 210 is positioned adjacent to the larger diameter segment 206. A ledge 208 between the two segments 206 and 208 restricts intrusion of the piping into the reduced diameter segment 210. Similarly, the outlet fluid passage includes a larger diameter segment, 216, a reduced diameter segment 220 and a ledge 218 therebetween. Both of the larger diameter segments 206 and 216 are shown as smooth to accommodate a glue joint with pipe fixtures. However, the larger diameter segments 206 and 216 can alternately be threaded to accommodate threaded pipe fixtures. The diaphragm valve seat 224 has a central opening circumscribed by the upper edge of an inner wall 228 of the valve body 200. A curved segment 222 is disposed in the valve body 200 opposite the diaphragm valve seat 224 to redirect the fluid flowing through the opening of the diaphragm valve seat 224 to the outlet 204. A curved or inclined segment 212 is disposed on the opposite side of the divider wall 214 in the inlet fluid passage to redirect the fluid flow from the inlet 202 to the diaphragm valve seat 224. On the outlet side of the valve body 200, a bore 254 is sized to receive a portion of the bonnet 300, as will be described in greater detail below, and an aligned bore 252 permits drainage of fluid from the control chamber 304, via in part the bores 252 and 254, into the reduced diameter segment 220 of the outlet passage.

The valve body 200 also includes an upstanding annular wall 240 positioned to bound a portion of the fluid flow path upstream of the opening of the diaphragm valve seat 224. The wall 240 includes an annular recess 260 for use in positioning and sealing the diaphragm assembly 700, as will be discussed in greater detail below. The wall 240 is positioned to be engaged with the bonnet 300. To this end, a plurality of bolt holes are provided in the bonnet 300 and are aligned with bolt-receiving bores in the valve body 200 to permit the bonnet 300 to be secured to the valve body 200 using a plurality of bolts, as shown in FIG. 1.

Figure 7:
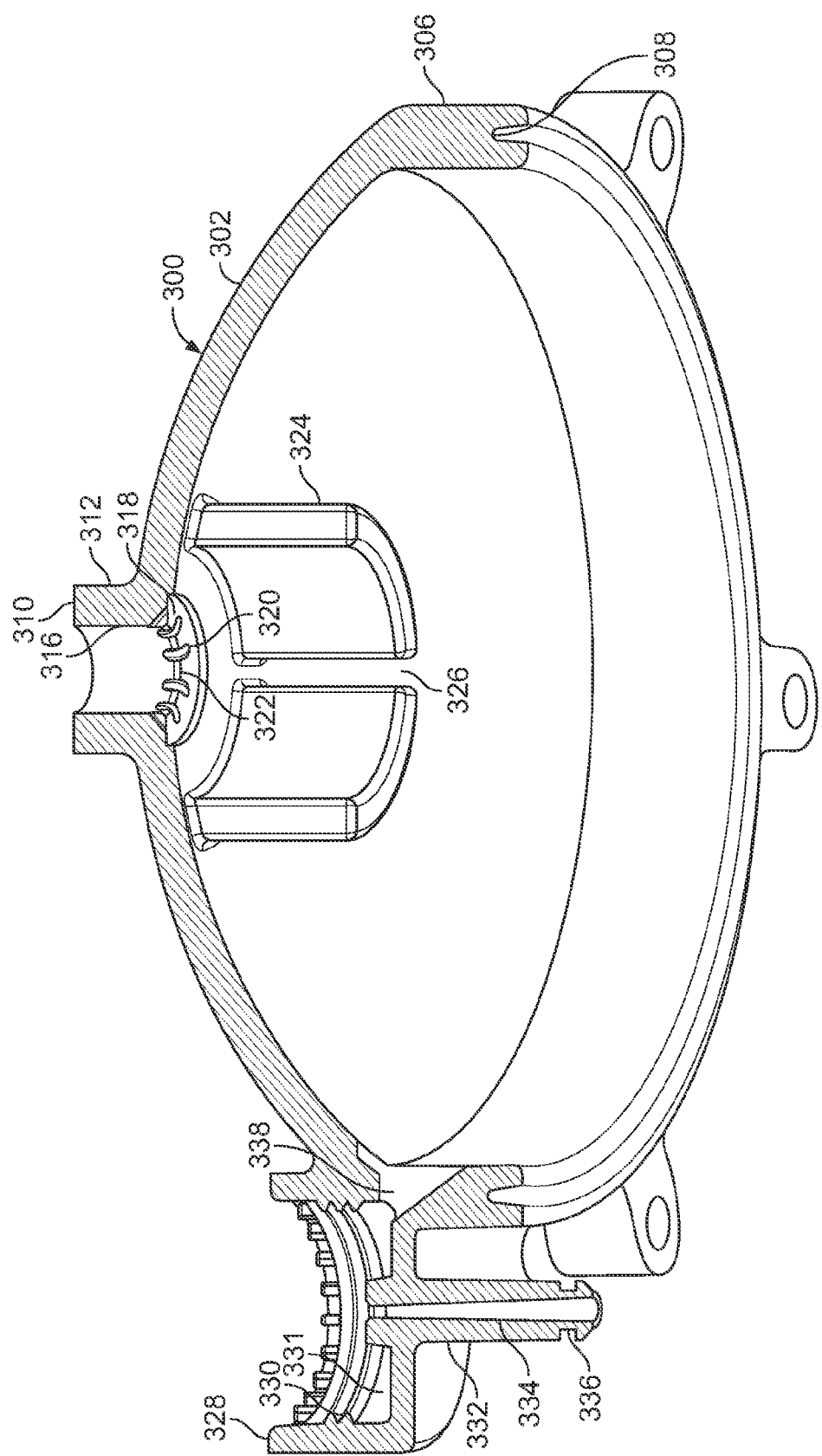
FIG. 7 is a perspective section view of the underside of the bonnet of FIG. 1.
Figure 8:
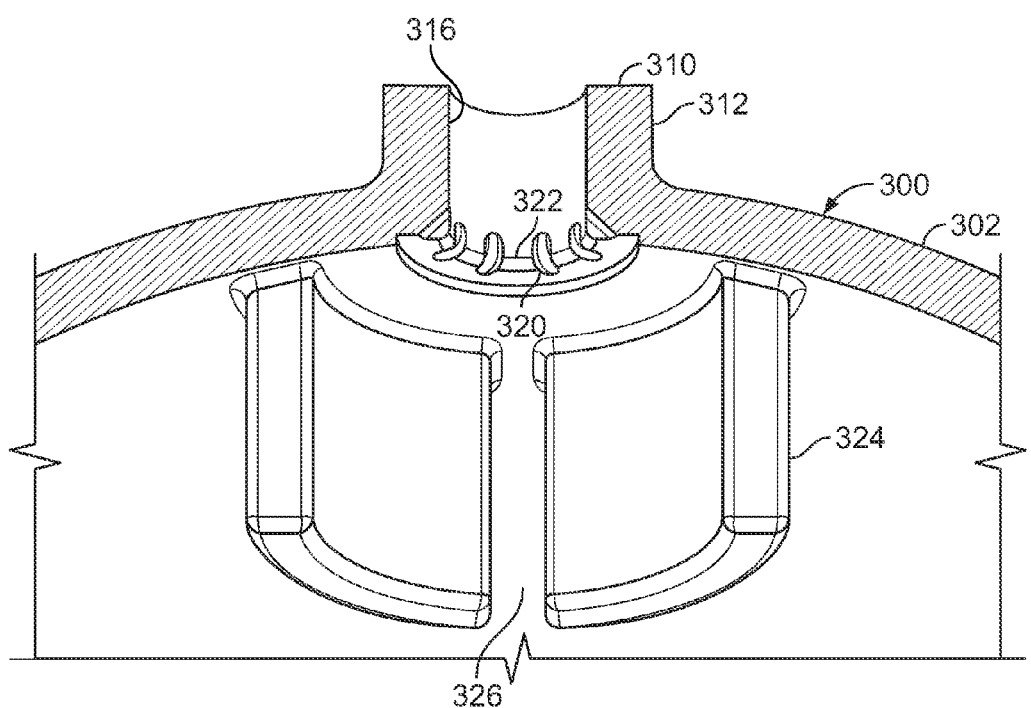
FIG. 8 is a detailed perspective view of venting passages of the underside of the bonnet of FIG. 7.

The bonnet 300 has a generally dome-shaped portion 302 surrounded by a peripheral depending wall 306, as illustrated in FIG. 3. A central opening 316 is formed through the dome-shaped portion 302 of the bonnet 300 for accommodating components of the flow-control and the bleed assembly 600, which will be discussed in greater detail below. The opening 316 of the bonnet 300 is formed in an outwardly-extending stem 312, having an outwardly-facing surface 310, as illustrated in FIGS. 7 and 8. The depending wall 306 has an annular recess 308 for use in securing the diaphragm assembly 700, as will be discussed below. A solenoid mount 328 and aligned discharge spout 334 having an internal bore 332 are integrally formed with the bonnet 300 in order to accommodate the solenoid valve 400. A flow chamber exit passage 338 formed in the bonnet 300 extends between the control chamber 304 and an outer chamber or bowl 394 formed between the solenoid valve 400 and the solenoid mount 328, as also will be discussed in greater detail below, to permit fluid to drain from the control chamber 304.

Figure 10:
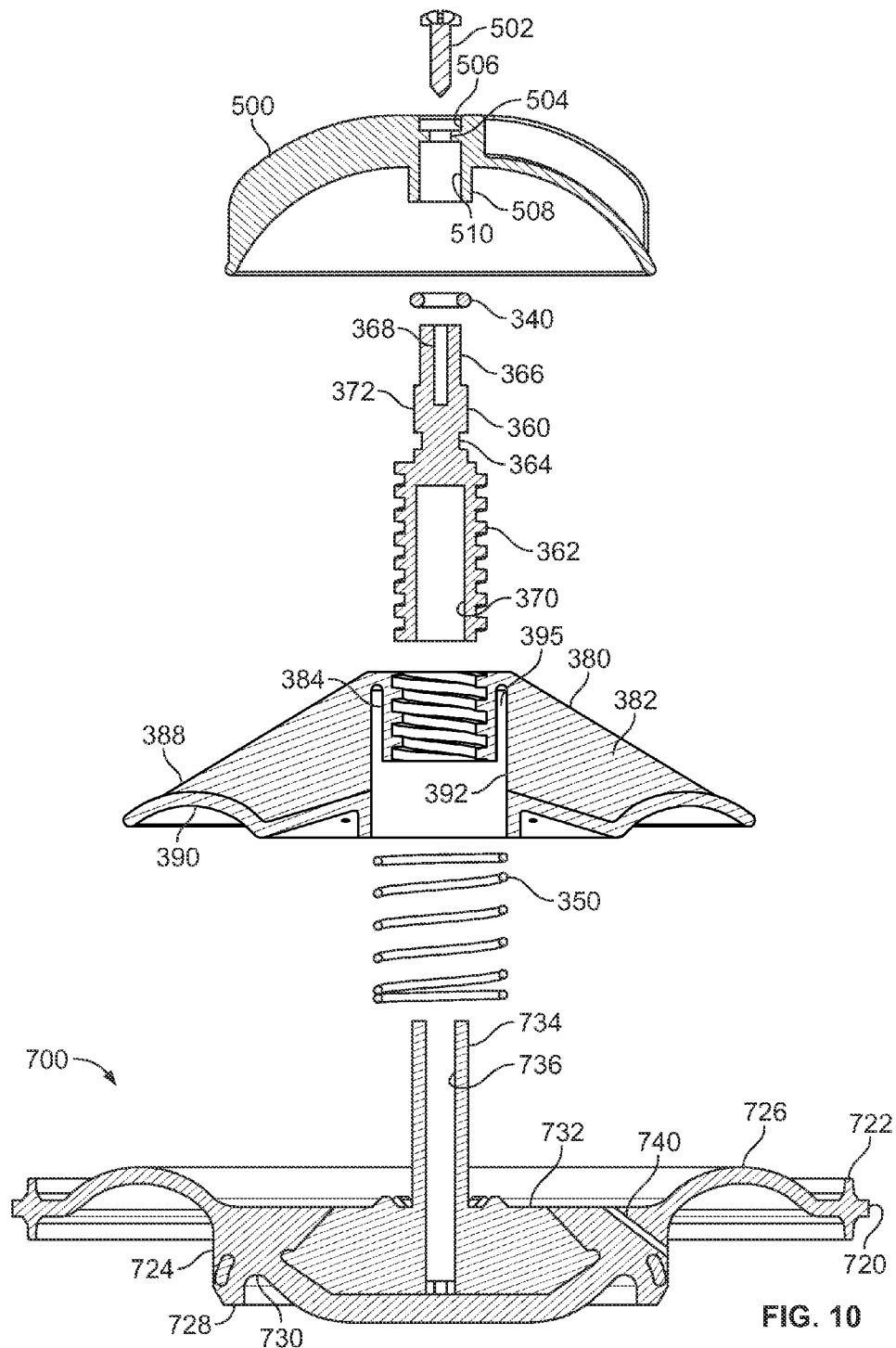
FIG. 10 is an exploded section view of the diaphragm valve stem assembly and the flow control stop of FIG. 9.
Figure 11:
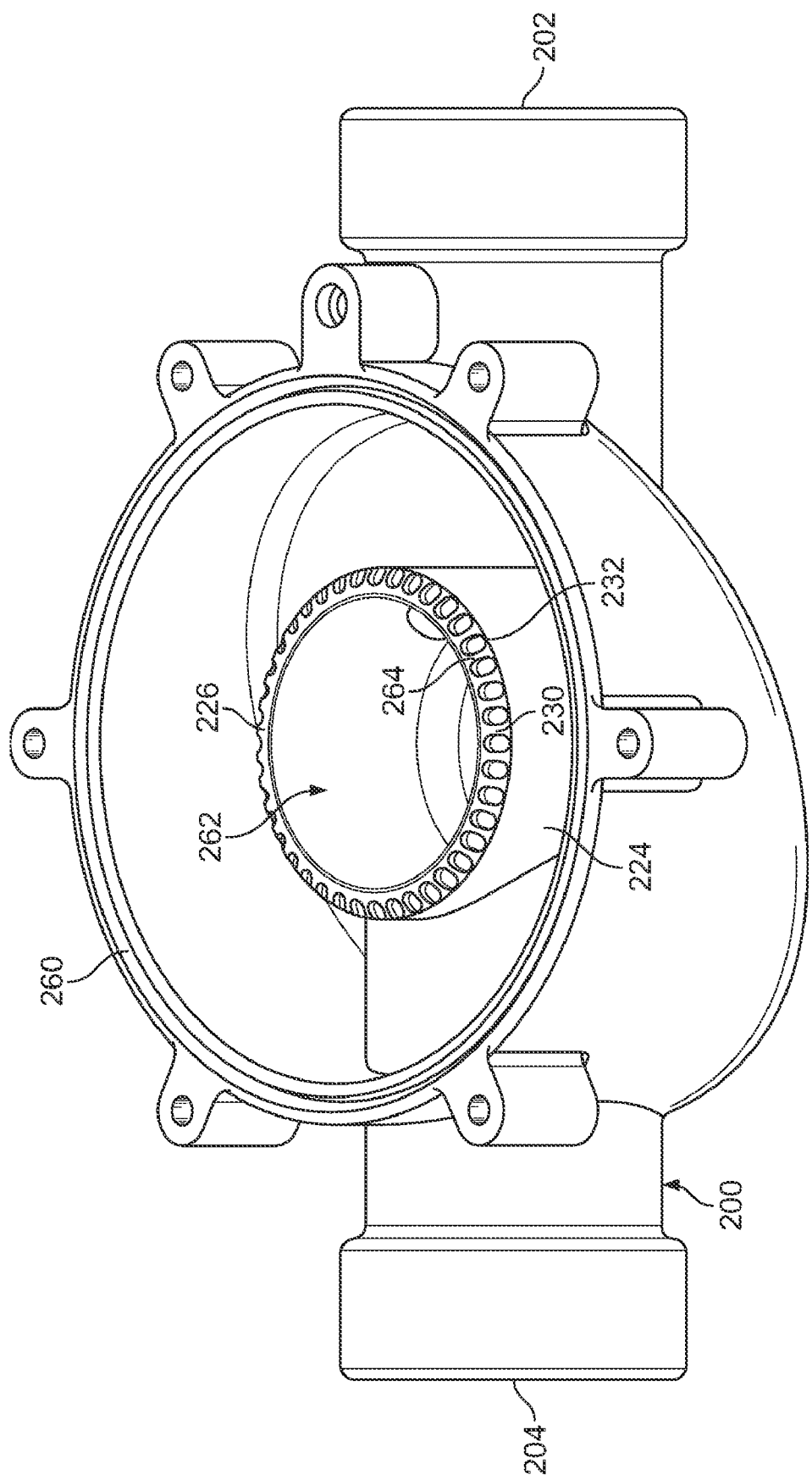
FIG. 11 is a perspective view of a valve body of the diaphragm valve of FIG. 1 showing the valve seat.

The diaphragm assembly 700 includes a flexible diaphragm element 720 reinforced with a diaphragm stiffener 732. The flexible diaphragm element 720 is preferably made from an unreinforced material, such as nitrile rubber. In order to stiffen the seat area of the diaphragm assembly 700, the flexible portion 720 is molded around the diaphragm stiffener 732, as illustrated in FIG. 10. Typically, fiber-reinforced materials commonly used in the flexible member 726 of the diaphragm assembly 700 are more costly due to the cost of the processing used to impregnate the fiber reinforcement with rubber. This reinforcement is unnecessary in this valve due to the generally full-span flow control piston 380, which prevents the un-reinforced flexible member 726 from ballooning and bursting when valve flow is throttled with the flow control. The flow control piston 380 will be explained in greater detail herein. The material of the diaphragm stiffener 732, such as acetal, is more rigid than the material of the diaphragm element 720 such that reinforcement is provided in a low cost manner.

The diaphragm assembly 700 functions to both selectively permit fluid flow through the diaphragm valve 100 by being either engaged with or spaced from the diaphragm valve seat 224. To this end, the diaphragm assembly 700 includes a first seal 730 and a second seal 728. The first seal 730 is positioned to abut against a face 226 of the diaphragm valve seat 224 (shown in FIG. 11), while the second seal 728 is positioned to engage an outer surface of the diaphragm valve seat 224, upstream from the opening of the diaphragm valve seat 224. The use of both first and second seals 730 and 728, as well as the configuration of the diaphragm valve seat 224, permits for a multi-stage reduction in the flow area between the diaphragm assembly 700 and the diaphragm valve seat 224 when the diaphragm assembly 700 is being shifted toward the diaphragm valve seat 224 for blocking fluid flow through the diaphragm valve 100. The use of multi-stage reduction in the flow area can reduce the water hammer effect that can occur when, as in typical diaphragm valves having single-stage sealing, the diaphragm valve is suddenly closed and a resulting pressure spike causes potentially harmful vibration to the system.

The diaphragm valve seat 224 includes an annulus that projects upward from the surrounding portion of the valve body 200, and includes the sealing face 226 that is positioned to be engaged by the first seal 730 when the diaphragm valve 100 is in its closed position to block fluid flow through the opening of the diaphragm valve seat 224. Extending radially inward between an outer wall of the diaphragm valve seat 224 and the sealing face 226 is an inclined surface 264, as illustrated in FIGS. 11-14. The inclined surface 264 includes a plurality of recesses or bypass cut-outs 232 spaced by a plurality of sealing flats 230. The inclined surface 264, and specifically the bypass cut-outs 232 and sealing flats 230, has a configuration permitting gradual, multi-stage sealing of the opening of the diaphragm valve seat 224 by the first and second seals 730 and 728.

Figure 12:
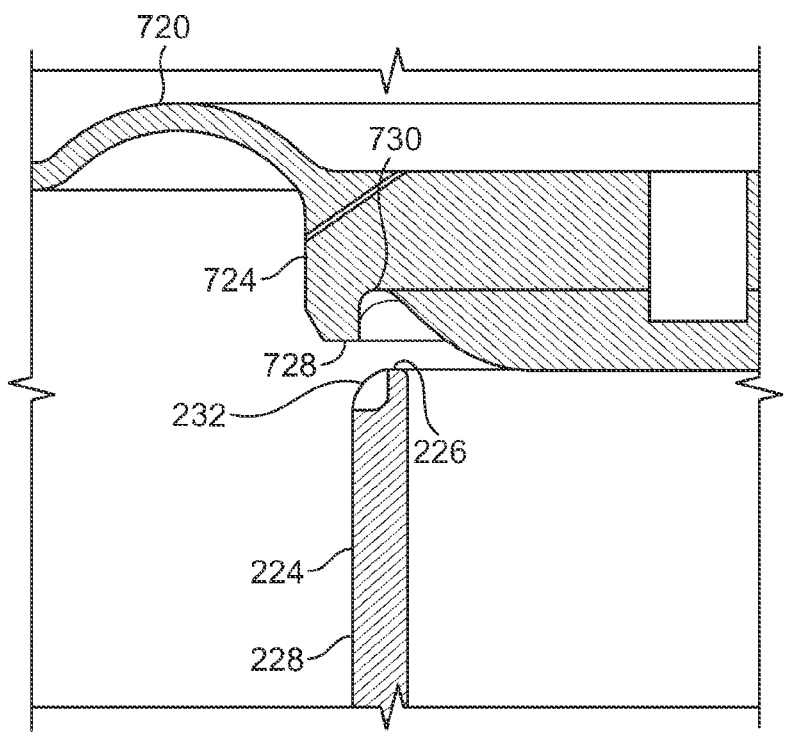
FIG. 12 is a partial section view of the valve seat and diaphragm valve stem assembly of the diaphragm valve of FIG. 1 in the open stage.
Figure 13:
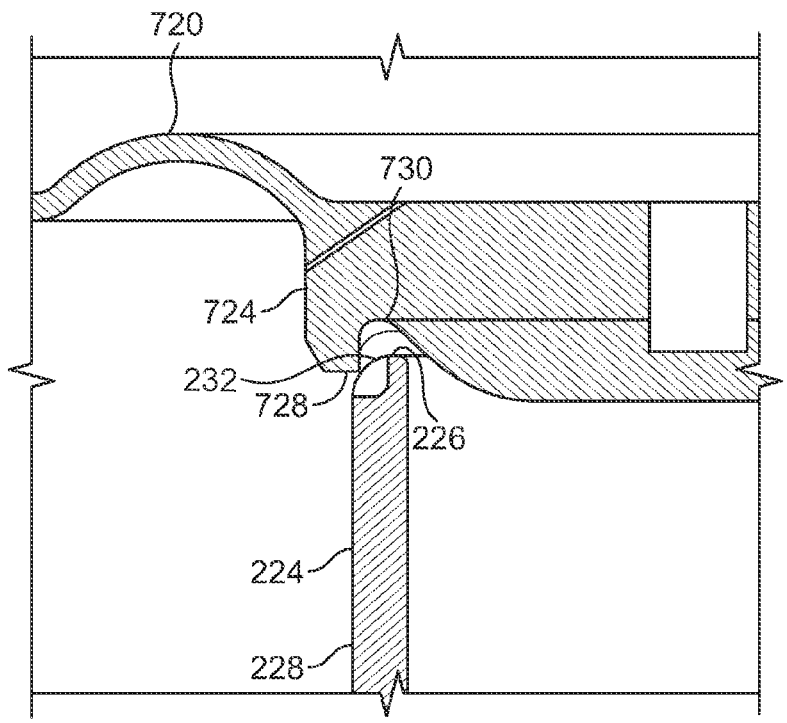
FIG. 13 is a partial section view of the valve seat and diaphragm valve stem assembly of the diaphragm valve of FIG. 1 in the intermediate stage.
Figure 14:
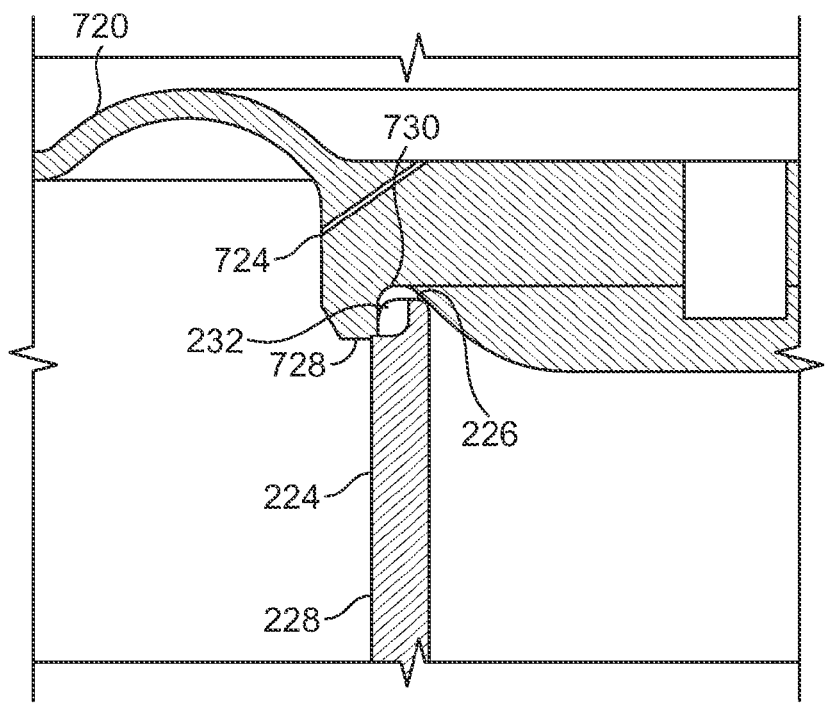
FIG. 14 is a partial section view of the valve seat and diaphragm valve stem assembly of the diaphragm valve of FIG. 1 in the closed stage.
Figure 15:
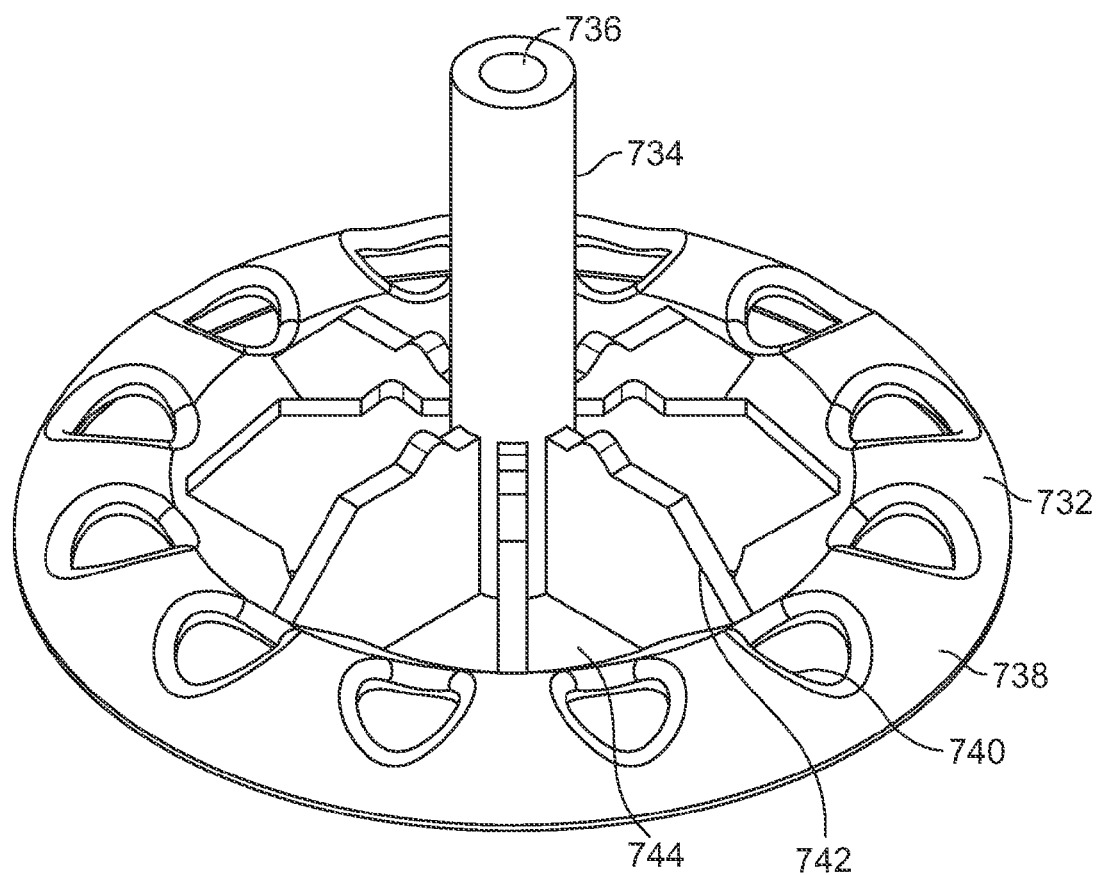
FIG. 15 is a perspective view of a stiffener of the diaphragm assembly of the diaphragm valve of FIG. 1.
Figure 16:
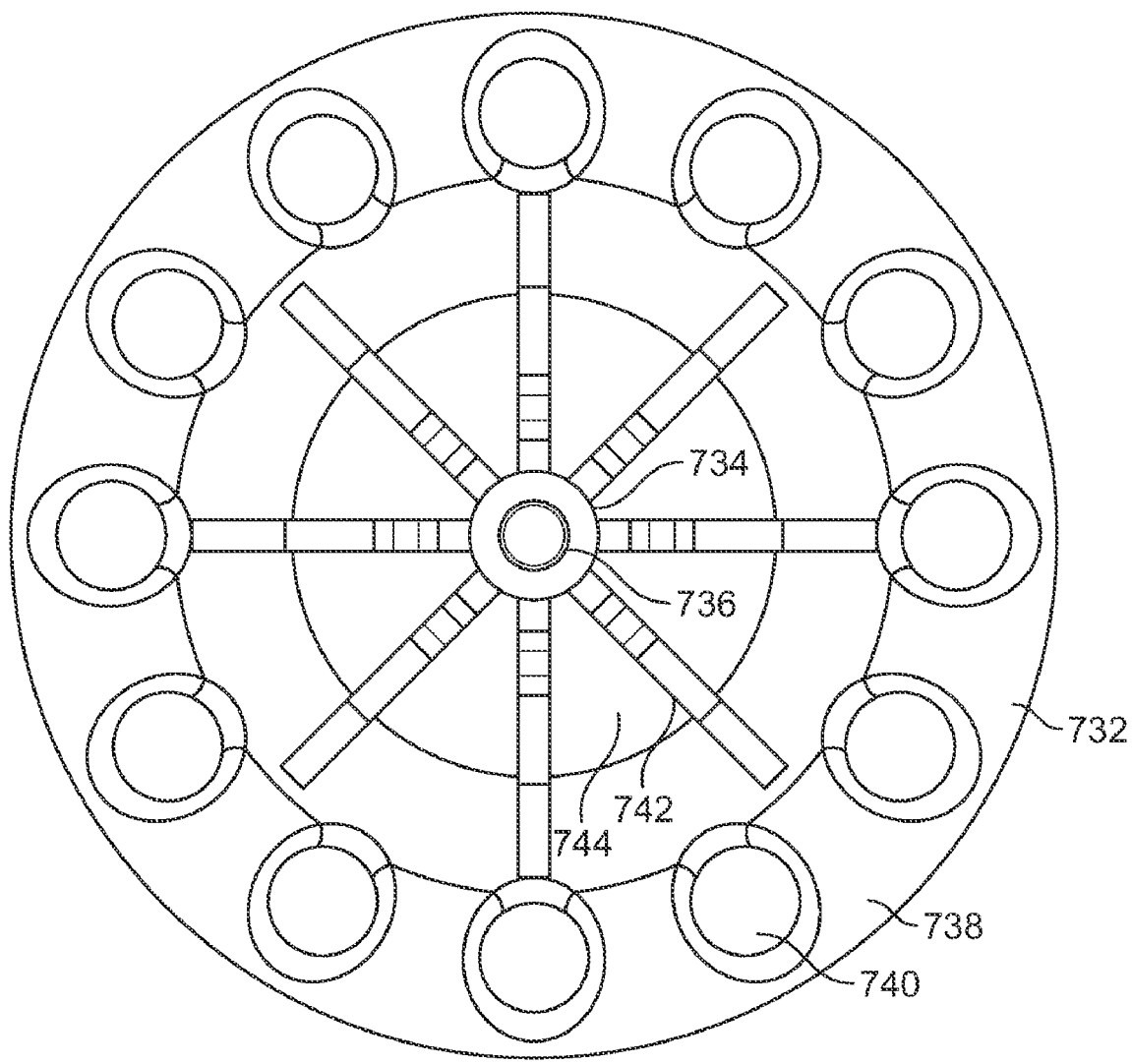
FIG. 16 is a top plan view of the stiffener of FIG. 15.

The multi-stage sealing of the diaphragm valve 100 includes an open stage, an initial sealing stage and a final sealing stage. In the open stage, fluid flow is permitted through the opening of the diaphragm valve seat 224, which corresponds to the open position of the diaphragm valve 100, thereby permitting fluid flow between the inlet opening 202 and the outlet opening 204 of the valve body 200. Both of the first and second seals 730 and 728 are spaced from engagement with the diaphragm valve seat 224 and there is a flow area between the same through which fluid can flow, as illustrated in FIGS. 4 and 12. This flow area is a factor in determining the amount of fluid flowing between the inlet opening 202 and the outlet opening 204 of the valve body 200 when the diaphragm valve 100 is in its open position. In the initial sealing stage, illustrated in FIG. 13, the second seal 728 is engaged with the inclined surface 264 of the exterior of the diaphragm valve seat 224. More specifically, the inclined surface 264 is engaged with the sealing flats 230 to block fluid flow therepast. However, fluid flow is permitted between the second seal 728 and the bypass cut-outs 232. In the initial sealing stage, the first seal 730 is not engaged with the sealing face 226 of the diaphragm valve seat 224. Thus, in the initial sealing stage, the fluid flow through the opening 262 of the diaphragm valve seat 224, and thus between the inlet opening 202 and outlet opening 204 of the valve body 200, is partially but not fully blocked and the flow area is decreased but not to zero. The depth of the bypass cut-outs 232 may decrease outwardly from the sealing face 226, such that the flow area decreases in a non-linear manner as the diaphragm assembly 700 moves toward the diaphragm valve seat 224. In the final sealing stage, the first seal 730 is engaged with the sealing face 226 of the diaphragm valve seat 224 to block fluid flow through the opening of the diaphragm valve seat 224, as illustrated in FIGS. 3 and 14, and thus the diaphragm valve 100 is in its closed position.

The multi-stage sealing of the diaphragm valve 100 has the benefits of providing a more gradual blocking of the opening of the diaphragm valve seat 224 as compared to typical single-stage diaphragm valves. The more gradual blocking advantageously reduces the suddenness of the shifting of the diaphragm valve 100 from its open position to its closed position, which can lead to a reduction in the water hammer effect and resulting harmful vibrations to the components of the diaphragm valve 100 and the connected irrigation system. In a typical single-stage diaphragm valve, the water hammer effect is due to a rapid reduction in the flow area between seal and the diaphragm valve seat. This rapid reduction can lead to a pressure spike in the fluid flow as the fluid flow through the diaphragm valve seat is suddenly ceased. The pressure spike has a peak that is larger than the fluid pressure when the single-stage diaphragm valve is in its closed position. By comparison, the multi-stage sealing of the presently-disclosed diaphragm valve 100 has a comparatively less-rapid reduction in flow area between the first and second seals 730 and 728 and the diaphragm valve seat 224. The less-rapid reduction in flow area of the presently-disclosed diaphragm valve 100 is believed to reduce any resulting pressure spike and the resulting water hammer effect. Notably, it is believed that during shifting from the open position to the closed position the presently-disclosed diaphragm valve 100 will not experience a pressure significantly greater than the final line pressure due to the multi-stage sealing.

Figure 17:
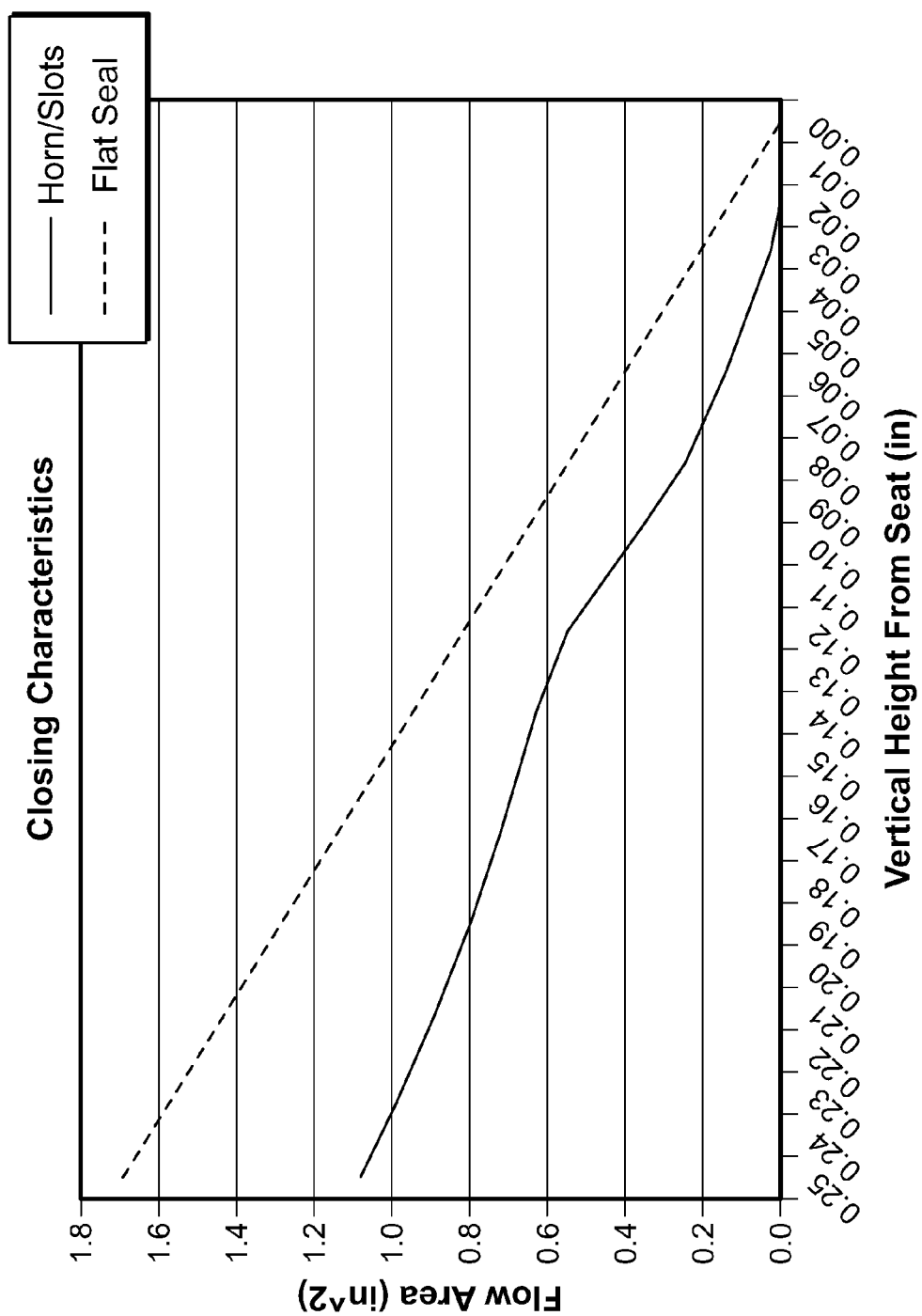
FIG. 17 is a graph comparing the flow area with the position of the diaphragm valve stem assembly relative to the seat of a prior art diaphragm valve and the diaphragm valve disclosed herein.

As can be seen in the graph of FIG. 17, using the presently-disclosed multi-stage design results in a more gradual reduction of flow area and closing of the valve 100 as compared to single-stage sealing. This gradual closing can reduce or eliminate the water hammer experienced when closing more conventionally designed valves. The data for the comparative example of FIG. 12 was calculated from a 3-D electronic model of the presently-disclosed, multi-stage diaphragm valve 100 and an actual sample of a typical single-stage diaphragm valve, set forth in the table below:

| Seal Height from Bottom of Valve (inches) | Flow Area with Multi-Stage Sealing (square inches) | Flow Area with Single Stage Sealing (square inches) |
|---|---|---|
| 0.25 | 1.0840 | 1.6964 |
| 0.24 | 1.0320 | 1.6286 |
| 0.23 | 0.9800 | 1.5607 |
| 0.22 | 0.9320 | 1.4928 |
| 0.21 | 0.8840 | 1.4250 |
| 0.20 | 0.8440 | 1.3571 |
| 0.19 | 0.8000 | 1.2893 |
| 0.18 | 0.7640 | 1.2214 |
| 0.17 | 0.7280 | 1.1536 |
| 0.16 | 0.6960 | 1.0857 |
| 0.15 | 0.6640 | 1.0178 |
| 0.14 | 0.6320 | 0.9500 |
| 0.13 | 0.5920 | 0.8821 |
| 0.12 | 0.5440 | 0.8143 |
| 0.11 | 0.4680 | 0.7464 |
| 0.10 | 0.3880 | 0.6786 |
| 0.09 | 0.3120 | 0.6107 |
| 0.08 | 0.2400 | 0.5429 |
| 0.07 | 0.1920 | 0.4750 |
| 0.06 | 0.1440 | 0.4071 |
| 0.05 | 0.1040 | 0.3393 |
| 0.04 | 0.0640 | 0.2714 |
| 0.03 | 0.0240 | 0.2036 |
| 0.02 | 0.0032 | 0.1357 |
| 0.01 | 0.0000 | 0.0679 |
| 0.00 | 0.0000 | 0.0000 |

As shown by the data in the above example, there is a sharp discontinuity between the slope of the curve at closure for the typical single stage valve. This discontinuity correlates to a rapid deceleration of the flow as the valve slams shut. By comparison, the slope of the curve for the multi-stage diaphragm valve 100 gradually decreases as it approaches closure, shown by the comparatively smooth transition approaching the horizontal axis on the graph as the valve 100 closes. For example, the flow area of the single stage valve decreases by about 0.41 square inches during the last 0.06 inches of travel, compared to a decrease in flow area of only about 0.14 for the diaphragm valve 100 disclosed herein having multi-stage sealing. This decreasing slope and smooth transition to closed can correlate to a more gradual closing and reduced pressure spike and reduction in the corresponding water hammer effect. The slope of the curve, the change in slope, and the smooth transition at closure can be tailored according to particular requirements of the diaphragm valve 100, such as by varying the shapes of the inclined surface 264 and the bypass cut-outs 232, the volume of the cut-outs 232 and the ratio between the sealing flats 230 and the cut-outs 232.

Flowstream debris that comes in contact with the first seal 730 may degrade its capability to fully engage the sealing face 226 of the diaphragm valve seat 224. The second seal 728 can function to reduce debris that flows to the first seal 730 by providing an obstruction to debris flowing toward the sealing face 226. Restricting the flow of such debris can advantageously improve reliability of sealing of the diaphragm valve 100 and can improve the life of the diaphragm valve 100 and its individual components.

The diaphragm assembly 700 also functions to supply operating fluid to the control chamber 304 positioned between the bonnet 300 and valve body 200 via a control chamber inlet passage 740 through the diaphragm element 720, as shown in FIG. 10. The supply of operating fluid to the control chamber 304 may be continuously available when the diaphragm valve 100 is supplied with fluid regardless of whether the diaphragm valve 100 is in is open position or its closed position.

Turning now to more of the details of the diaphragm assembly 700, the diaphragm element 720 includes a central segment 724, an outer bead 722 and a flexible member 726 extending therebetween. The outer bead 722 is used to secure and seal the diaphragm assembly 700 to the bonnet 300 and body 200. More specifically, the outer bead 722 is held in place between the recess 308 of the bonnet 300 and the recess 260 of the body 200, as illustrated in FIGS. 3-6. The central segment 724 carries the first and second seals 730 and 728, and has in its interior the diaphragm stiffener 732. The diaphragm stiffener 732, shown without the surrounding diaphragm element 720 in FIGS. 15 and 16, includes a center stem 734 having an internal bore 736, a peripheral annulus 738 and a plurality of ribs 742 spaced by gaps 744 connecting the center stem 734 to the peripheral annulus 738. The gaps 744 between the ribs 742 and openings 740 formed in the peripheral annulus 738 permit portions of the diaphragm element 720 to extend therebetween after molding in order to secure the diaphragm element 720 and the diaphragm stiffener 732 to each other. The peripheral annulus 738 of the diaphragm stiffener 732 has an arcuate or cup shape, as shown in FIG. 10, such that it provides reinforcement to the diaphragm element 720 in the locations of the first and second seals 730 and 728. This stiffening beneficially can prevent the flexible diaphragm element from being blown down into the opening of the seat 224 and can prevent second seal 728 from ballooning away from sealing flats 230 when high-velocity water cavitates upon valve closing.

The flow-control and bleed assembly 600 permits adjustments to be made to the flow rate of fluid through the diaphragm valve 100. The flow-control assembly 600 accomplishes these adjustments by controlling the maximum spacing between the diaphragm assembly 700 and the diaphragm valve seat 224 when the diaphragm valve 100 is in its open position, and more particularly the maximum spacing and flow area between the first and second seals 730 and 728 and the diaphragm valve seat 224. Increasing the maximum spacing between the first and second seals 730 and 728 and the diaphragm valve seat 224 will increase the maximum flow rate through the opening of the diaphragm valve seat 224, while decreasing the maximum spacing between the first and second seals 730 and 728 and the diaphragm valve seat 224 will comparatively decrease the maximum flow rate through the opening of the diaphragm valve seat 224. In this manner, the flow rate of fluid through the diaphragm valve 100 can be adjusted by a user according to the requirements of the irrigation system in which the diaphragm valve 100 is installed.

The flow-control and bleed assembly 600 also permits for pressurized fluid to be bled from the control chamber 304 and vented to the atmosphere. Unlike typical prior bleed assemblies, the presently disclosed bleed assembly 600 is configured to have a gradual increase in flow area of a vent passage in order to prevent rapidly-venting fluid from dislodging a seal, such as an o-ring 340. The assembly 600 is also configured to direct the pressurized fluid escaping from the control chamber 304 away from a user in order to avoid spraying the user. This venting of fluid from control chamber 304 can facilitate flushing of debris from the flow path between the inlet and outlet 202 and 204.

Figure 9:
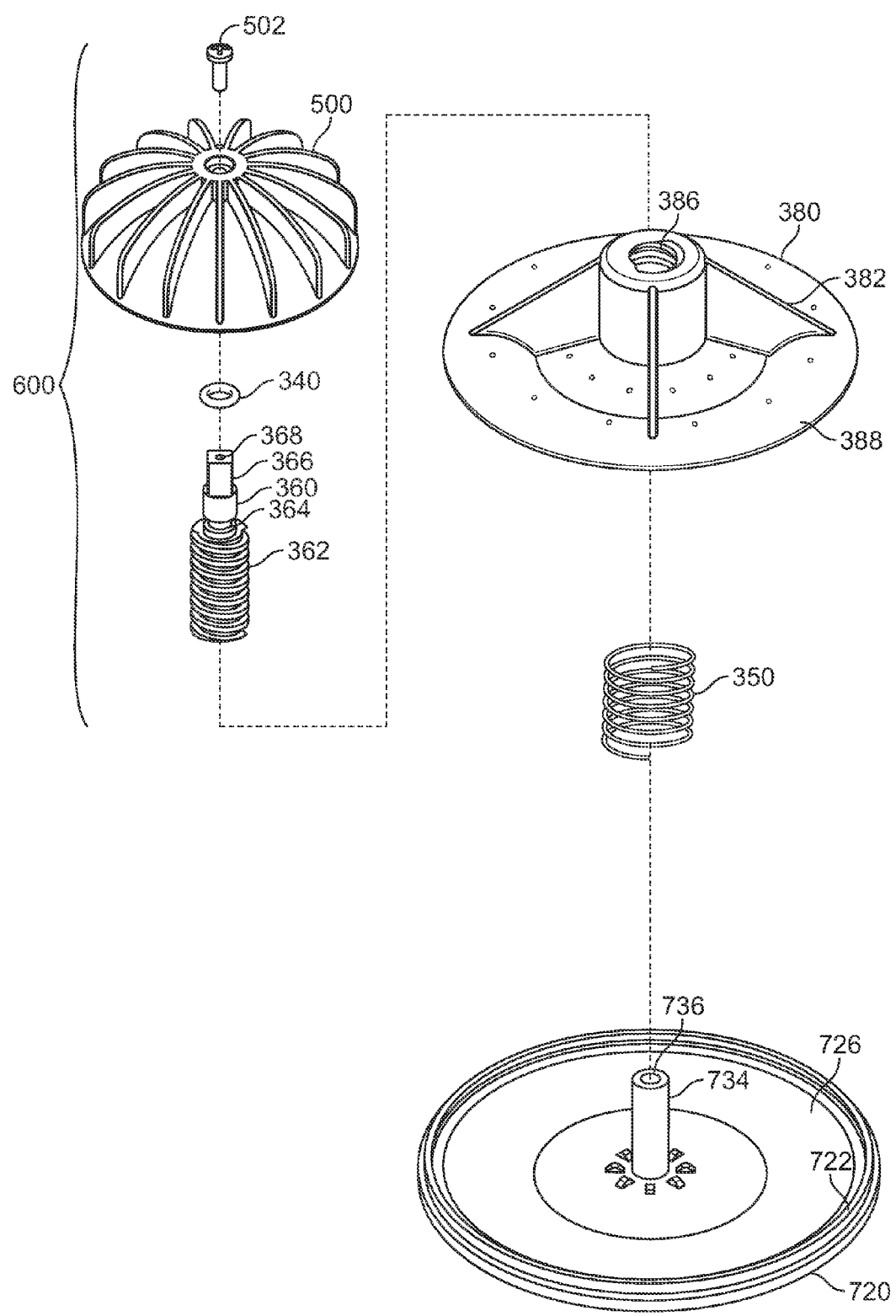
FIG. 9 is an exploded perspective view of the diaphragm valve stem assembly and the flow control stop of FIG. 3.

The flow-control and bleed assembly 600, shown with the diaphragm assembly 700 in FIGS. 9 and 10, includes a flow control piston 380, a spring 350, a flow control screw 360 and the o-ring 340. The flow control piston 380 is used to define the maximum open position of the diaphragm assembly 700 from the diaphragm valve seat 224, as discussed above. The flow control piston 380 is axially moveable upon rotation of the flow-control handle 500, which in turn causes rotation of the flow control screw 360. The flow control piston 380 is fixed from rotation, such that rotation of the flow control screw 360 causes the flow control piston 380 to move upward or downward along its axis.

The flow control piston 380 includes an internally-threaded central stem 384 disposed in a downwardly-open recess 392 and a disc-shaped segment 388 extending radially outward therefrom. The disc-shaped segment 388 includes an abutment surface 390 against which the flexible member 726 of the diaphragm element 720 abuts when the diaphragm assembly 700 is in its open position, spaced from the diaphragm valve seat 224. Positioning of the abutment surface 390 thus controls the maximum spacing of the diaphragm assembly 700 from the diaphragm valve seat 224. A plurality of upwardly-extending ribs 382 are received in gaps 326 formed between walls 324 downwardly-depending from the underside, facing the control chamber 304, of the dome-shaped portion 302 of the bonnet 300, as illustrated in FIG. 7. When the ribs 382 are received in the gaps 326 between the walls 324 of the bonnet 300, rotation of the flow control piston 380 relative to the bonnet 300 is prevented.

The flow control screw 360 is generally cylindrical, including an upper segment 366 and an externally-threaded lower segment 362. The upper segment 366 has a diameter sized to extend through the opening 316 in the bonnet 300. The upper segment also has an internally-threaded bore 368 sized to receive the externally-threaded handle retention screw 502. More specifically, the handle retention screw 502 has a head and a shaft. The shaft is insertable through an opening 504 in the flow control handle 500, as shown in FIG. 10. The opening 504 is sized such that the head of the handle retention screw 502 cannot pass, and thus can be nested in the recess 506 of the flow control handle 500 facing away from the bonnet 300. The upper segment 366 of the flow control screw 360 extends into a bore 510 of the flow control handle, facing the bonnet 300. The upper segment 366 may have a square or polygonal profile that mates with a matching profile of the bore 510 to prevent relative rotation therebetween. Thus, the flow control screw 360 can be attached to the flow control handle 500 using the handle retention screw 502, such that rotation of the handle 500 causes rotation of the flow control screw 360, both in clockwise and counterclockwise directions.

The externally-threaded lower segment 362 of the flow control screw 360 is received and threadingly engaged in the internally-threaded central stem 384 of the flow control piston 380. The engagement between the internal threads of the central stem 384 of the flow control piston 380 and the external threads of the lower segment 362 of the flow control screw 360, as well as the abutment between the ribs 382 of the flow control piston 380 and the walls 324 of the bonnet 300, results in the flow control piston 380 to be axially moveable away from and toward the diaphragm valve seat 224 when the flow control screw 360 is rotated either clockwise or counterclockwise using the flow control handle 500. Thus, adjustment of the spacing of the flow control piston 380 can be made to adjust the maximum open position of the diaphragm assembly 700 from the diaphragm valve seat 224, as illustrated in FIG. 4.

A spring 350 is positioned between the flow control piston 380 and the diaphragm assembly 700 to bias the diaphragm assembly 700 toward its closed position, illustrated in FIG. 3. The spring 350 has an upper end held in position by being received in the recess 392 of the flow control piston 380 and partially disposed in an annular recess 395 surrounding the central stem 384, as shown in FIGS. 3-6. The spring 350 has a lower end that is held in position by upwardly-extending portions of the ribs 742 of the diaphragm stiffener 732 of the diaphragm assembly 700, also as shown in FIGS. 3-6.

In order to guide the axial movement of both the flow control piston 380 and the diaphragm assembly 700, the stem 734 of the diaphragm stiffener 732 of the diaphragm assembly 700 extends through the central stem 384 of the flow control piston 380 and into an internal bore 370 of the lower segment 362 of the flow control screw 360.

Turning now to the bleed operation of the flow-control and bleed assembly 600, the flow control screw 360 includes an intermediate segment 372, disposed between the upper segment 366 and lower segment 362 that has an annular recess 364 for receiving the o-ring 340. When not configured for bleeding fluid from the control chamber 304, the o-ring 340 engages an inner wall of the opening 316 of the bonnet 300, as shown in FIGS. 3 and 4.

Figure 6:
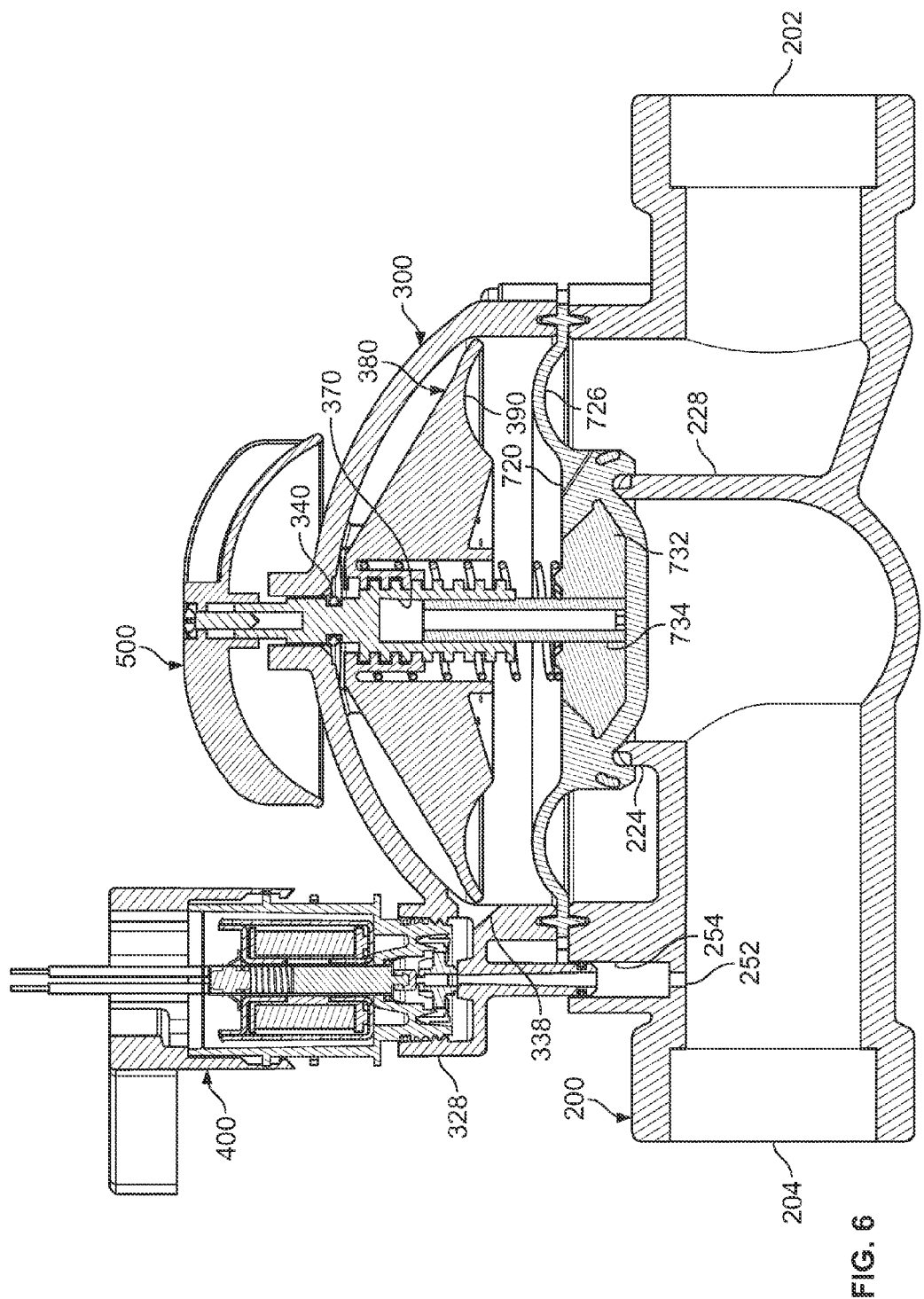
FIG. 6 is a section view of the diaphragm valve of FIG. 1 similar to that of FIG. 3 but showing the flow control stop in a venting position.

To vent fluid from the flow control chamber 304, the o-ring 340 is moved inwardly toward the flow control chamber 304 and away from engagement with the inner wall of the opening 316 of the bonnet 300, as shown in FIG. 6, to permit fluid to vent through the opening 316 and between the inner wall of the opening and the flow control screw 360. In typical prior art diaphragm valves, the pressure of the venting fluid can dislodge the o-ring from the recess and cause it to move back into the opening of the bonnet, thereby blocking further venting of fluid. To combat this problem, the underside of the bonnet 300 of the presently-disclosed diaphragm valve 100 is configured to permit a more controlled venting of fluid from the control chamber 304. More specifically, the underside of the bonnet 300 is configured so that the bleed flow area between the o-ring 340 and the inner wall of the opening 316 gradually increases as the o-ring 340 is carried inwardly toward the control chamber 304 by the flow control screw 360. The gradual increase in bleed flow area reduces the initial escaping of pressurized fluid, thereby reducing the likelihood that the venting fluid will dislodge the o-ring 340 from the annular recess 364.

Turning to one example of a bonnet 300 configured for a gradual increase in flow area during venting, a plurality of grooves 320 span the junction of the undersurface of the dome-shaped portion 302 and the inner wall of the opening 316 of the stem 312, as illustrated in FIGS. 7 and 8. These grooves 320 are separated from each other by surfaces 322. When the o-ring 340 is being moved from its sealing position blocking fluid from exiting the control chamber 304, illustrated in FIGS. 3-5, to its non-sealing position permitting fluid to exit the control chamber 304, illustrated in FIG. 6, there is an intermediate position where the o-ring 340 is in contact with the surfaces 322 to block fluid flow therepast but fluid flow is permitted through the grooves 320.

As can be seen in the graph of FIG. 18, using the presently-disclosed bonnet 300 results in a gradual increase in the bleed flow area during venting with the goal of preventing the o-ring 340 from dislodging and reblocking the venting fluid. The data for the graph of FIG. 18 was calculated from a 3-D electronic model of the presently-disclosed, multi-stage diaphragm valve 100, set forth in the table below:

| O-ring Displacement (inches) | Bleed Area (square inches) |
|---|---|
| 0 | 0.0000 |
| 0.02 | 0.0000 |
| 0.04 | 0.0000 |
| 0.06 | 0.0000 |
| 0.08 | 0.0000 |
| 0.1 | 0.0030 |
| 0.12 | 0.0110 |
| 0.14 | 0.0144 |
| 0.16 | 0.0144 |
| 0.18 | 0.0144 |

As shown by the data in the above example, there is a gradual increase in the bleed flow area as the o-ring 340 is inwardly displaced from the inner wall of the opening 316 of the bonnet 300. The slope of the curve and the change in slope can be tailored according to particular requirements of the diaphragm valve 100, such as by varying the shapes of the recesses 320, the volume of the recesses 320 and the ratio between the surfaces 322 and the recesses 320.

Figure 5:
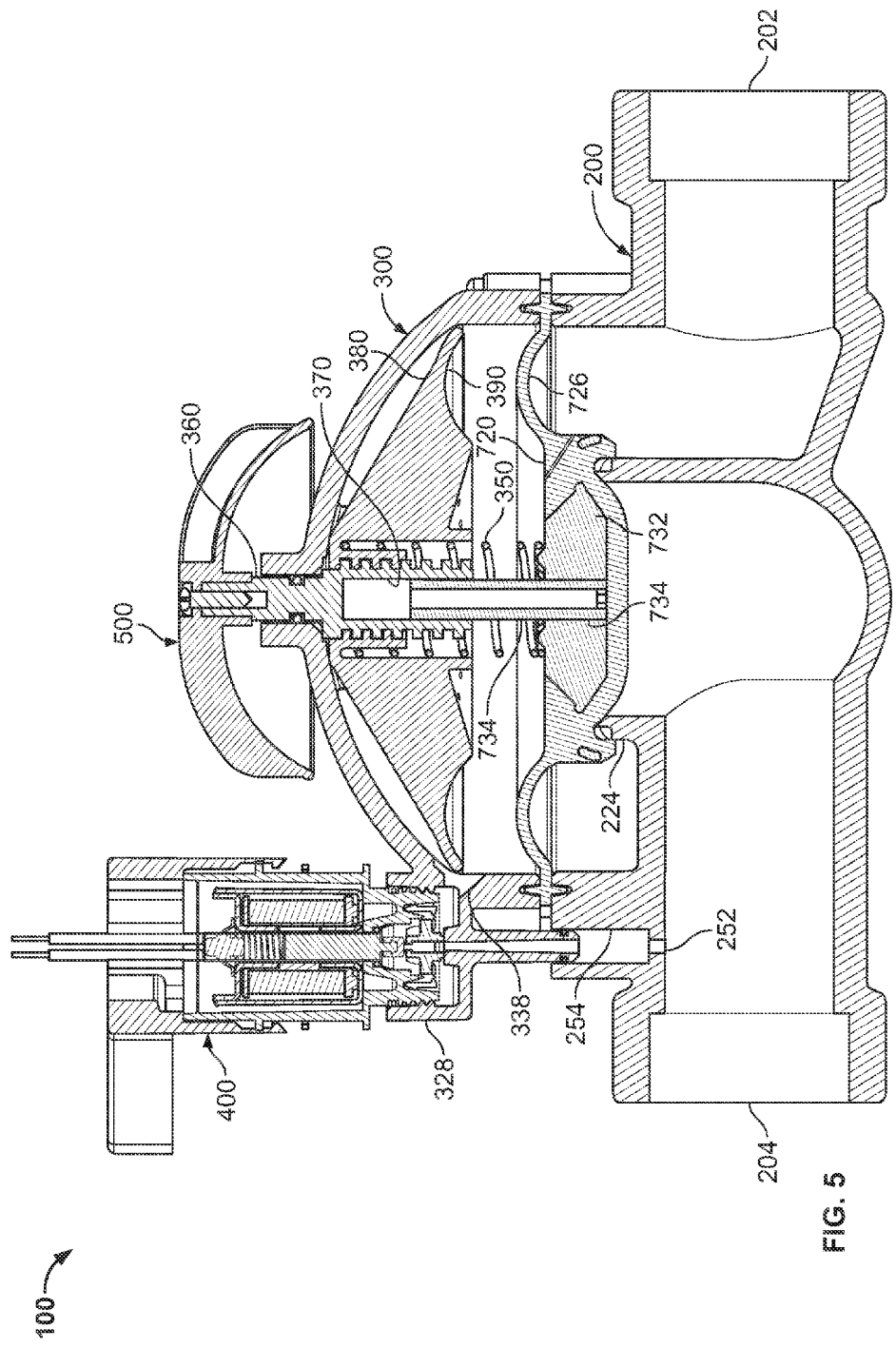
FIG. 5 is section view of the diaphragm valve of FIG. 1 similar to that of FIG. 3 but showing a flow control stop in a pre-venting position.

To vent the control chamber 304, the flow control screw 360 is moved to its maximum position toward the underside of the dome-shaped portion 302 of the bonnet 300, as illustrated in FIG. 5. This is accomplished by rotating the flow control handle 500 until the flow control piston 380 abuts the underside of the dome-shaped portion 302 of the bonnet 300. From this position, continued rotation of the flow control handle 500 will draw the flow control screw 360 inwardly toward the control chamber 304. The o-ring 340 carried by the flow control screw 360 is normally prevented from moving inwardly toward the control chamber 304 by engagement between an inner sleeve 508 of the flow control handle 500 and the outwardly-facing surface 310 of the stem 312 of the bonnet 300. To move the o-ring 340 further inward, the handle retention screw 502 is loosened from the bonnet 300 such that the spacing between the inner sleeve 508 of the flow control handle 500 and the outwardly-facing surface 310 of the stem 312 of the bonnet 300 can increase. The flow control handle 500 can then be downwardly depressed to urge the o-ring 340 from its sealing position to its non-sealing position to permit venting of fluid therepast. Alternatively, the flow control handle 500 can be rotated to draw the o-ring 340 from its sealing position to the non-sealing position to permit fluid to vent therepast. The venting fluid can be directed downwardly toward the exterior of the dome-shaped portion 302 of the bonnet 300 by the underside of the flow control handle 500. When venting is complete, the handle retention screw 502 can be retightened and the flow control screw 360 and carried o-ring 340 drawn back into the sealing position to block venting.

Opening and closing the diaphragm valve 100 is performed by unblocking and blocking the control chamber exit passage 338 that vents fluid from the control chamber 304. Assuming the valve 100 starts in a closed condition, when an electrical current is sent to the solenoid valve 400, the solenoid valve 400 actuates and permits fluid flow between the control chamber 304 and the outlet opening 204 of the valve body 200, thus venting the control chamber 304 to the pressure of the outlet opening 204. Because when electrical current is first started, there is only atmospheric pressure at the outlet opening 204, the pressure in the control chamber 304 pressure drops to near atmospheric. At that point, the generally much higher fluid-supply pressure acting on the bottom of the diaphragm assembly 700 through the inlet opening 202 of the valve body 200 urges the diaphragm assembly 700 off the diaphragm valve seat 224, thus allowing fluid flow through the opening 262 and to the outlet 204. A typical irrigation system is generally at atmospheric pressure, downstream of the valve, when the electrical current is sent to the solenoid valve 400. At that time, the pressure in the control chamber 304 does not exert sufficient resistance as compared to the incoming fluid acting on the other side of the diaphragm assembly 700. As a result, the diaphragm assembly 700 may rise to the mechanical limit set by the flow control piston 380.

However, once the irrigation system fills and pressurizes, the difference in pressure between the inlet 202 and outlet 204 of the diaphragm valve 100 can be limited to the valve characteristic pressure drop at the flow rate allowed by the irrigation system. At that point, the higher pressure at the outlet 204 will, because of the fluid connection between the outlet 204 and the control chamber 304 through the control chamber exit passage 338, increase the pressure in the control chamber 304. The increased pressure can drive the diaphragm assembly 700 downward toward the diaphragm valve seat 224 until a balance is achieved between the force exerted on the bottom of the diaphragm assembly 700 by the fluid flowing through the valve 100 and that acting on the top of the diaphragm assembly 700 by the fluid in the control chamber 304. The valve 100 will stabilize in this equilibrium position until the electrical current to the solenoid valve 400 is interrupted to allow the valve 100 to close.

When the electrical current to the solenoid valve 400 ceases, the solenoid valve 400 closes and blocks fluid flow from the control chamber 304 to the outlet 204 through the control chamber exit passage 338. High-pressure fluid upstream of the diaphragm assembly 700 is still feeding high pressure fluid into the control chamber 304 through the control chamber inlet passage 740. Because there is nowhere for the high-pressure fluid to go, pressure in the control chamber 304 rises to nearly the high incoming line pressure. Due to the increased area on the diaphragm assembly 700 facing the control chamber 304 as compared to on an opposite side thereof, the force is no longer in equilibrium and the diaphragm assembly 700 descends until it abuts against the diaphragm valve seat 224 to block fluid flow between the inlet 202 and outlet 204 of the valve 100.

Turning now to the details of the solenoid valve 400, and with specific reference to FIG. 3, a solenoid housing 402 is joined to the solenoid mount 328. More specifically, the lower end of the solenoid housing 402 includes a cylindrical stem 404 having external threading 406 engageable with internal threading 330 of the mount 328. The solenoid mount 328 also includes a lower stem 332 sized to be received in the bore 254 of the valve body 200, and an o-ring 337 may be received in an annular groove 336 thereof for sealing with the bore 254 of the valve body 200.

A plunger sleeve 452 has a closed end and an open end extending into the cylindrical stem 404. A rubber plug 446 is disposed adjacent the closed end of the plunger sleeve 452, and is spaced by a compression spring 448 from a magnetizable plunger 444. The tip of the plunger 444, opposite the spring 448, has an attached plunger cap 442 for sealing an orifice 440 of a plunger retainer 415 to selectively prevent fluid from flowing through a bore 418 of the plunger retainer 415.

The solenoid housing 402 encloses a winding 450 surrounding a portion of a plunger sleeve 452. When electrical current is passed through the winding 450, the plunger 444 is drawn within the plunger sleeve 452 toward the plug 446 at the closed end of the plunger sleeve 452 against the biasing force of the spring 448 to withdraw the plunger cap 442 from sealing the orifice 440 of the plunger retainer 415 to permit fluid to drain from the secondary chamber 438, through the orifice 440 and bore 418 of the plunger retainer 415, through the bore 334 of the stem 332 of the solenoid mount 328, through the large bore 254 and small bore 252 of the valve body 200, and finally into the outlet passage 204. Conversely, when electrical current is not passed through the winding 450, the spring 448 biases the plunger 444 outward from the plunger sleeve 452, causing the plunger cap 442 attached thereto to seal the orifice 440 of the plunger retainer 415 and prevent fluid from draining from the secondary chamber 438, which in turn prevents fluid from draining from the control chamber 304.

The fluid path from the control chamber 304 to the outlet passage and the outlet opening 204 is through the control chamber exit passage 338 through the dome-shaped portion 302 of the bonnet 300 and into the bowl 394. From the bowl 394, fluid flows into the secondary chamber 438. Once in the secondary chamber 438, the fluid can exit only when the plunger cap 442 is spaced from orifice 440 of the intermediate element 415.

When the cap 442 is blocking the orifice 440, fluid flow from the control chamber 304 is blocked and the forces acting on the control chamber 304 side of the diaphragm assembly 700 are greater than the forces acting on its upstream side. This causes the first and second seals 730 and 728 to engage the diaphragm valve seat 224 and block fluid flow through the opening of the diaphragm valve seat 224. This corresponds to the closed position of the diaphragm valve 100.

Conversely, when solenoid winding 450 is energized to cause the plunger 444 to be drawn toward the plug 446 to draw the plunger cap 442 from the orifice 440, fluid is permitted to drain from the control chamber 304. When fluid is drained from the control chamber 304, the forces acting on the control chamber side of the diaphragm assembly 700 are no longer greater than the forces acting on the opposite side, which results in the assembly 700 shifting toward the bonnet 300 and the first and second seals 730 and 728 being spaced from the diaphragm valve seat 224 to permit fluid flow through the opening thereof.

The drawings and the foregoing descriptions are not intended to represent the only forms of the diaphragm valve 100 in regard to the details of construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation. For example, although the foregoing benefits may each be achieved in the presently-disclosed diaphragm valve 100, other diaphragm valves may be configured to incorporate less than all of the configurations that result in these benefits.

The invention claimed is:

1. A diaphragm valve comprising:
 a valve body having an inlet passage and an outlet passage;
 a diaphragm assembly positioned between the inlet passage and the outlet passage, the diaphragm assembly having a closed position where fluid flow from the inlet passage to the outlet passage is blocked and an open position where fluid flow from the inlet passage to the outlet passage is permitted;
 a bonnet having a neck defining an opening;
 a control chamber disposed on a control side of the diaphragm assembly and bounded at least in part by the control side of the diaphragm assembly and the bonnet;
 a rotatable flow control shaft extending through the opening of the bonnet, the flow control shaft being movable along a longitudinal axis relative to the bonnet between a sealed position where a seal is engaged with the neck to block fluid flow through the opening from the control chamber and a bleed position where the seal is spaced from the neck to permit fluid flow through the opening from the control chamber, a flow area between the neck and the seal increasing gradually as the flow control shaft is moved from the sealed position to the bleed position; and
 a stop axially moveable relative to the flow control shaft from a first position retained by the shaft to a second position retained by the shaft for limiting movement of the flow control shaft from the sealed position to the bleed position when in the first position, the stop being selectively moveable to the second position to permit movement of the flow control shaft from the sealed position to the bleed position.

2. The diaphragm valve of claim 1 wherein one or more recesses are formed in the neck, the recesses permitting fluid flow between the seal and the neck as the flow control shaft is moved from the sealed position to the bleed position.

3. The diaphragm valve of claim 2 wherein the recesses are positioned around a circumference of the neck and at an end of the neck facing the control chamber.

4. The diaphragm valve of claim 3 wherein the recesses are inclined radially outward.

5. The diaphragm valve of claim 2 wherein the seal is an o-ring positioned in a circumferential groove of the flow control shaft.

6. The diaphragm valve of claim 1 wherein a flow control handle is positioned on an opposite side of the bonnet from the control chamber and is operably connected to the flow control shaft such that rotation of the flow control handle causes the flow control shaft to rotate, abutment of the handle and the bonnet defining the stop limiting movement of the flow control shaft from the sealed position to the bleed position when the flow control shaft is coupled to the flow control handle, the stop being releasable to permit movement of the flow control shaft from the sealed position to the bleed position when the flow control shaft is axially shifted relative to the flow control handle.

7. The diaphragm valve of claim 1 wherein the flow control shaft is rotatably connected to a flow control piston restricted from rotation relative to the bonnet such that rotation of the flow control shaft causes the flow control piston to shift to one of a plurality of different positions spaced from the diaphragm assembly to restrict maximum travel of the diaphragm assembly in the open position.

8. The diaphragm valve of claim 7 wherein the flow control piston has a support surface for supporting the diaphragm assembly in the position of maximum travel in the open position, the support surface extending substantially radially outward to an interior surface of the bonnet.

9. The diaphragm valve of claim 8 wherein the diaphragm assembly is positioned to cover an opening surrounded by a valve seat and positioned between the inlet passage and the outlet passage, the diaphragm valve member includes a flexible portion and a generally rigid core extending radially outward at least beyond a radial extent of the opening.

10. A method of venting fluid in an irrigation system, the method comprising:
   providing a valve body having an inlet passage and an outlet passage;
   providing a diaphragm assembly having a closed position where fluid flow from the inlet passage to the outlet passage is blocked and an open position where fluid flow from the inlet passage to the outlet passage is permitted;
   providing a control chamber bounded at least in part on one side by the diaphragm assembly and on the other side by a bonnet having a neck defining an opening;
   providing a flow control shaft extending through the opening and moveable inward relative to the bonnet from a sealed position where a seal is engaged with the neck to block fluid flow through the opening from the control chamber and a bleed position where the seal is spaced from the neck to permit fluid flow through the opening from the control chamber; venting the control chamber through one or more bypass recesses when the flow control shaft is positioned between the sealed position and the bleed position;
   providing a flow control handle operably connected to the flow control shaft for rotating the flow control shaft;
   limiting movement of the flow control shaft from the sealed position to the bleed position when the flow control handle is coupled to the flow control shaft at a first position; and
   permitting movement of the flow control shaft from the sealed position to the bleed position when the flow control handle is coupled to the flow control shaft at a second position axially spaced from the first position.

11. The method of claim 10 wherein the bypass recesses are formed in the neck of the bonnet and the venting is between the recesses and the seal.

12. The method of claim 11 wherein the seal is an o-ring partially disposed in a circumferential groove of the flow control shaft and the recesses extend radially outward from an end of the neck into the control chamber.

13. The diaphragm valve of claim 10 wherein venting the control chamber includes one of rotating the flow control handle to axially shift the flow control shaft or depressing the flow control handle to axially shift the flow control shaft.

* * * * *